(12) United States Patent
Noh et al.

(10) Patent No.: US 11,348,276 B2
(45) Date of Patent: May 31, 2022

(54) MOBILE ROBOT CONTROL METHOD

(71) Applicant: LG ELECTRONICS INC., Seoul (KR)

(72) Inventors: Dongki Noh, Seoul (KR); Jaekwang Lee, Seoul (KR); Seungwook Lim, Seoul (KR); Gyuho Eoh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 227 days.

(21) Appl. No.: 16/830,964

(22) Filed: Mar. 26, 2020

(65) Prior Publication Data
US 2020/0311970 A1 Oct. 1, 2020

(30) Foreign Application Priority Data
Mar. 27, 2019 (KR) .................. 10-2019-0035040

(51) Int. Cl.
*G06T 7/73* (2017.01)
*G06T 7/20* (2017.01)

(52) U.S. Cl.
CPC . *G06T 7/73* (2017.01); *G06T 7/20* (2013.01)

(58) Field of Classification Search
CPC .................................. G06T 7/20; G06T 7/70
See application file for complete search history.

(56) References Cited

U.S. PATENT DOCUMENTS 10,386,850 B2* 8/2019 Heinla .................. G06T 7/73
2011/0194755 A1* 8/2011 Jeong ................ G06K 9/00664
382/153
(Continued)

FOREIGN PATENT DOCUMENTS

JP H11-032253 A 2/1999
JP H11-185018 A 7/1999
(Continued)

OTHER PUBLICATIONS

Notice of Allowance, dated May 15, 2020, issued by the Korean Patent Office in Korean Patent Application No. 10-2019-0035040 (2 pages).
(Continued)

*Primary Examiner* — Shefali D Goradia
(74) *Attorney, Agent, or Firm* — Birch, Stewart, Kolasch & Birch, LLP

(57) ABSTRACT

A mobile robot and a method of controlling the mobile robot are disclosed. The method includes acquiring an image of an inside of a traveling zone. The method further includes performing a point-based feature point extraction by extracting a first feature point from the acquired image. The method also includes performing a block-based feature point extraction by dividing the acquired image into blocks having a predetermined size and extracting a second feature point from each of the divided block-unit images. The method also includes determining the current location by performing a point-based feature point matching using the first feature point and performing a block-based feature point using the second feature point. The method also includes storing the determined current location in association with the first feature point and the second feature point in a map.

15 Claims, 20 Drawing Sheets

(56) References Cited

U.S. PATENT DOCUMENTS

| | | | | |
|---|---|---|---|---|
| 2012/0051595 A1* | 3/2012 | Lee | ................ | G05D 1/0246 |
| | | | | 382/103 |
| 2012/0191287 A1* | 7/2012 | Shin | ................ | G05D 1/0274 |
| | | | | 701/28 |
| 2020/0327695 A1* | 10/2020 | Lin | ................ | G06K 9/00671 |

FOREIGN PATENT DOCUMENTS

| | | |
|---|---|---|
| JP | 2008-003674 A | 1/2008 |
| JP | 2008-071352 A | 3/2008 |
| JP | 2008-197884 A | 8/2008 |
| JP | 2011-008687 | 1/2011 |
| KR | 10-2001-0108160 | 12/2001 |
| KR | 10-2010-0104581 | 9/2010 |
| KR | 10-2011-0011424 | 2/2011 |
| KR | 10-2018-0023302 | 3/2018 |
| KR | 10-2018-0043753 | 4/2018 |

OTHER PUBLICATIONS

International Search Report, dated Jul. 15, 2020, issued in International Patent Application No. PCT/KR2020/004158 (4 pages).
Yoshinobu Hagiwara et al., "An Improvement of Positional Accuracy for View-Based navigation Using SURF," The Institute of Electrical Engineers of Japan, IEEE Transactions EIS. vol. 130, No. 8, 2010, pp. 1395-1403 (10 pages).
Office Action, dated May 25, 2021, issued in Japanese Patent Application No. 2020-058988 (2 pages).

* cited by examiner

| RECOGNITION FEATURE POINT | | RECOGNITION DESCRIPTOR |
|---|---|---|
| h1 | → | $\vec{H1}\{h1(1), h1(2), h1(3), \cdots h1(n)\}$ |
| h2 | → | $\vec{H2}\{h2(1), h2(2), h2(3), \cdots h2(n)\}$ |
| h3 | → | $\vec{H3}\{h3(1), h3(2), h3(3), \cdots h3(n)\}$ |
| h4 | → | $\vec{H4}\{h4(1), h4(2), h4(3), \cdots h4(n)\}$ |
| h5 | → | $\vec{H5}\{h5(1), h5(2), h5(3), \cdots h5(n)\}$ |
| h6 | → | $\vec{H6}\{h6(1), h6(2), h6(3), \cdots h6(n)\}$ |
| h7 | → | $\vec{H7}\{h7(1), h7(2), h7(3), \cdots h7(n)\}$ |

FIG. 11
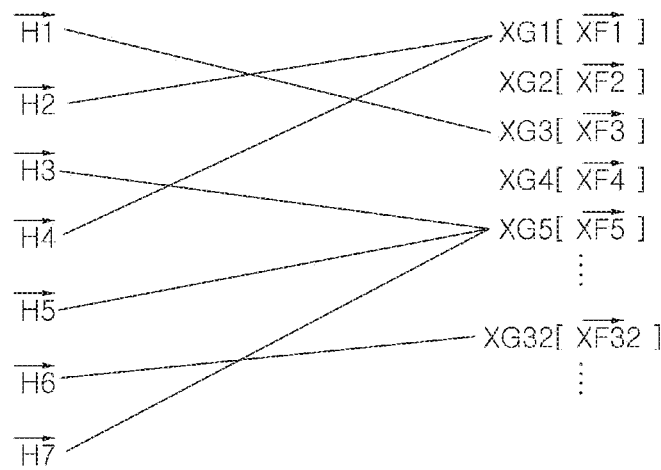
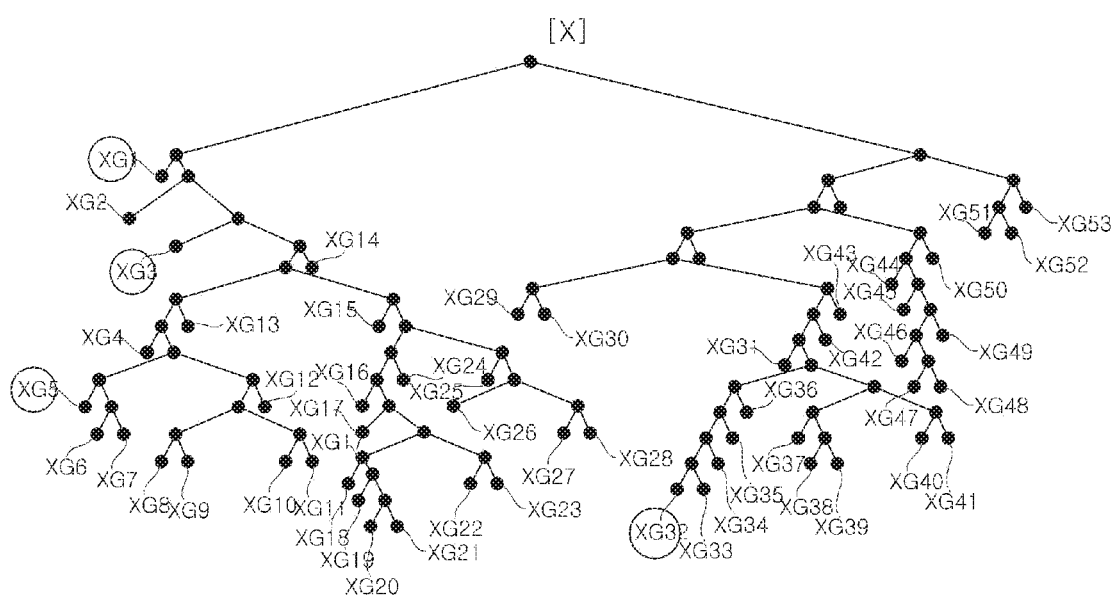

MOBILE ROBOT CONTROL METHOD

CROSS-REFERENCE TO RELATED APPLICATION

This application claims the benefit of priority of Korean Patent Application No. 10-2019-0035040, filed on Mar. 27, 2019 in the Korean Intellectual Property Office, the disclosure of which is incorporated herein by reference in its entirety.

BACKGROUND

1. Field

The present disclosure relates to a mobile robot and a method of controlling the same, and more particularly to technology of a mobile robot creating or learning a map or recognizing a position on the map.

2. Description of the Related Art

Robots have been developed for industrial purposes and have taken charge of a portion of factory automation. In recent years, the number of fields in which robots are utilized has increased. As a result, a medical robot and an aerospace robot have been developed. In addition, a home robot usable at home is being manufactured. Among such robots, a robot capable of autonomously traveling is called a mobile robot.

A typical example of a mobile robot used at home is a robot cleaner. The robot cleaner is an apparatus that cleans a predetermined region by suctioning dust or foreign matter in the predetermined region while traveling autonomously.

The mobile robot is capable of moving autonomously and thus moving freely, and may be provided with a plurality of sensors for evading an obstacle, etc. during traveling in order to travel while evading the obstacle.

A map of a traveling zone must be accurately created in order to perform a predetermined task, such as cleaning, and the current location of the mobile robot on the map must be accurately determined in order to move to a specific point in the traveling zone.

In addition, when the location of the mobile robot that is traveling is forcibly changed due to external factors, the mobile robot cannot recognize the unknown current location based on traveling information at the preceding location. As an example, a kidnapping situation in which a user lifts and transfers the mobile robot that is traveling may occur.

Research has been conducted on various methods of continuously determining the current location of the mobile robot based on traveling information of the mobile robot at the preceding location during continuous movement of the mobile robot (information about movement direction and movement velocity, comparison between continuously obtained floor photographs, etc.) in order to recognize the current location of the mobile robot. In addition, research has been conducted on various methods of the mobile robot creating and learning a map by itself.

In addition, technologies of the mobile robot recognizing an unknown current location using an image captured through a camera at the current location have been proposed.

A prior document (Korean Patent Application Publication No. 10-2010-0104581 published on Sep. 29, 2010) discloses technology of creating a three-dimensional map using feature points extracted from an image captured in a traveling zone and recognizing an unknown current location using a feature point based an image captured through a camera at the current location.

In the above prior document, the three-dimensional map is creased using the feature points extracted from the image captured in the traveling zone, and three or more pairs of feature points matched with the feature points in the three-dimensional map are detected from among feature points in an image captured at the unknown current location. Subsequently, by using two-dimensional coordinates of three or more matched feature points in an image captured at the current location, three-dimensional coordinates of three or more matched feature points in the three-dimensional map, and information about the focal distance of the camera at the current location, the distance is calculated from the three or more matched feature points, whereby the current location is recognized.

A method of comparing any one image obtained by capturing the same portion in the traveling zone with a recognition image to recognize the location from the feature point of a specific point, as in the above prior document, has a problem in that accuracy in estimating the current location may vary due to environmental changes, such as presence or absence of lighting in the traveling zone, or illuminance change depending on the incidence angle or amount of sunlight.

SUMMARY

A method of comparing any one image obtained by capturing the same portion in the traveling zone with a recognition image to recognize the location from the feature point of a specific point, as in the above prior document, has a problem in that accuracy in estimating the current location may vary due to environmental changes, such as presence or absence of lighting in the traveling zone, illuminance change depending on the incidence angle or amount of sunlight, and object location change. It is an object of the present disclosure to provide location recognition and map creation technology robust to such environmental changes.

It is another object of the present disclosure to provide efficient and accurate technology for location recognition in a traveling zone capable of increasing a success rate of recognition of the current location of a mobile robot and estimating the current location with higher reliability.

It is another object of the present disclosure to provide simultaneous localization and mapping (SLAM) technology capable of operating even in a low-illuminance environment.

It is a further object of the present disclosure to provide excellent SLAM technology even in a low-illuminance environment using block-based feature extraction and matching.

In order to accomplish the above and other objects, a mobile robot and a method of controlling the same according to an aspect of the present disclosure are capable of realizing excellent SLAM technology even in a low-illuminance environment using block-based feature extraction and matching.

In order to accomplish the above and other objects, a mobile robot and a method of controlling the same according to an aspect of the present disclosure are capable of creating a map robust to environmental change and accurately recognizing the location on the map using block-based feature extraction and matching.

In order to accomplish the above and other objects, a mobile robot and a method of controlling the same according to an aspect of the present disclosure are capable of performing efficient traveling and cleaning based on a single map capable of coping with various environmental changes.

In accordance with an aspect of the present disclosure, the above and other objects can be accomplished by the provision of a method of controlling a mobile robot, the method including acquiring an image of the inside of a traveling zone during traveling, extracting a feature point from the acquired image (point-based feature point extraction), dividing the acquired image into blocks having a predetermined size and extracting a feature point from each of the divided block-unit images (block-based feature point extraction), matching feature points of a node corresponding to the current location and a node located within a predetermined reference distance from the node corresponding to the current location using the feature point extracted in the point-based feature point extraction (point-based feature point matching), matching feature points of a node corresponding to the current location and a node located within the predetermined reference distance from the node corresponding to the current location using the feature point extracted in the block-based feature point extraction (block-based feature point matching), recognizing the current location based on the result of the point-based feature point matching and the result of the block-based feature point matching, and registering information about the recognized current location, point-based feature point information of the node corresponding to the current location, and block-based feature point information of the node corresponding to the current location on a map.

The point-based feature point extraction may include creating a descriptor corresponding to the extracted feature point based on distribution characteristics of a brightness gradient of pixels belonging to a certain area around the extracted feature point.

The block-based feature point extraction may include creating a descriptor by block based on distribution characteristics of a brightness gradient of the block-unit images.

The method may further include acquiring traveling information during traveling, wherein the acquiring an image may include acquiring the above image through an image acquisition unit in the case in which the amount of movement from the previous node is greater than a threshold value based on the acquired traveling information.

Alternatively, the method may further include acquiring traveling information during traveling, and selecting an image having an amount of movement from the previous node greater than the threshold value, among images acquired through the image acquisition unit in the image acquisition, as a key frame image, wherein the point-based feature point extraction and the block-based feature point extraction may be performed with respect to the key frame image.

In accordance with another aspect of the present disclosure, the above and other objects can be accomplished by the provision of a method of controlling a mobile robot, the method including acquiring an image of the inside of a traveling zone during traveling, dividing the acquired image into blocks having a predetermined size and extracting a feature point from each of the divided block-unit images (block-based feature point extraction), matching the feature point extracted in the block-based feature point extraction with block-based feature point information registered on a map (block-based feature point matching), and recognizing the current location based on the result of the block-based feature point matching.

The block-based feature point extraction may include creating a descriptor by block based on distribution characteristics of a brightness gradient of the block-unit images.

The method may further include extracting a feature point from the acquired image (point-based feature point extraction), and matching the feature point extracted in the point-based feature point extraction with point-based feature point information registered on the map, wherein the recognizing the current location may include recognizing the current location based on the result of the point-based feature point matching and the result of the block-based feature point matching.

The point-based feature point extraction may include creating a descriptor corresponding to the extracted feature point based on distribution characteristics of a brightness gradient of pixels belonging to a certain area around the extracted feature point.

The method may further include acquiring traveling information during traveling, wherein the acquiring an image may include acquiring the above image through an image acquisition unit in the case in which the amount of movement from the previous node is greater than a threshold value based on the acquired traveling information.

Alternatively, the method may further include acquiring traveling information during traveling, and selecting an image having an amount of movement from the previous node greater than the threshold value, among images acquired through the image acquisition unit in the image acquisition, as a key frame image, wherein the block-based feature point extraction may be performed with respect to the key frame image.

The method may further include acquiring illuminance information through a sensor unit, wherein the block-based feature point extraction may be performed in the case in which the illuminance information satisfies a condition set as a low-illuminance environment.

In the case in which the illuminance information does not satisfy the condition set as the low-illuminance environment, point-based location recognition may be performed. The method may further include extracting a feature point from the acquired image in the case in which the illuminance information does not satisfy the condition set as the low-illuminance environment (point-based feature point extraction), matching the feature point extracted in the point-based feature point extraction with point-based feature point information registered on the map, and recognizing the current location based on the result of the point-based feature point matching.

The point-based feature point extraction may include creating a descriptor corresponding to the extracted feature point based on distribution characteristics of a brightness gradient of pixels belonging to a certain area around the extracted feature point.

The recognizing the current location may include setting a plurality of particles, which are location candidates, based on the block-based feature point matching, calculating a weight for the particles, deciding the current location based on the weight of the particles, and resampling the particles.

BRIEF DESCRIPTION OF THE DRAWINGS

The above and other objects, features and other advantages of the present disclosure will be more clearly understood from the following detailed description taken in conjunction with the accompanying drawings, in which:

FIGS. 10 to 13 are reference views illustrating location recognition according to an embodiment of the present disclosure;

DETAILED DESCRIPTION

Reference will now be made in detail to embodiments, examples of which are illustrated in the accompanying drawings. However, the present disclosure may be embodied in many different forms and should not be construed as being limited to the embodiments set forth herein.

Meanwhile, in the following description, with respect to constituent elements used in the following description, the suffixes "module" and "unit" are used or combined with each other only in consideration of ease in preparation of the specification, and do not have or indicate mutually different meanings. Accordingly, the suffixes "module" and "unit" may be used interchangeably.

Also, it will be understood that although the terms "first," "second," etc., may be used herein to describe various components, these components should not be limited by these terms. These terms are only used to distinguish one component from another component.

A mobile robot 100 according to an embodiment of the present disclosure means a robot capable of autonomously moving using wheels or the like, and may be a home helper robot and a robot cleaner. Hereinafter, a robot cleaner having a cleaning function, which is a kind of mobile robot, will be described by way of example with reference to the drawings; however, the present disclosure is not limited thereto.

Figure 1:
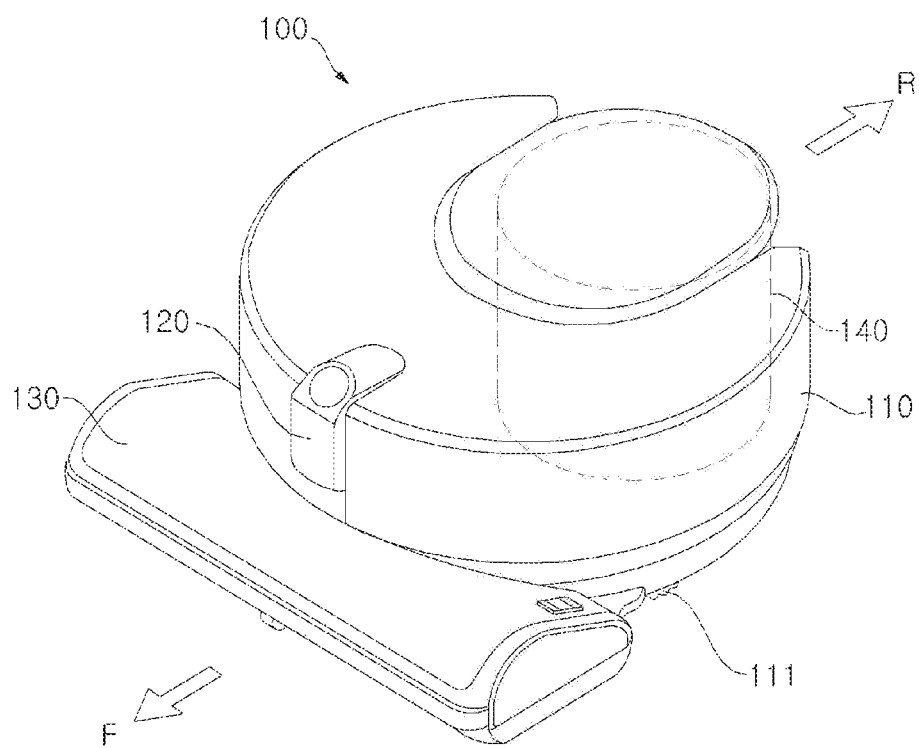
FIG. 1 is a perspective view showing a mobile robot according to an embodiment of the present disclosure.
Figure 2:
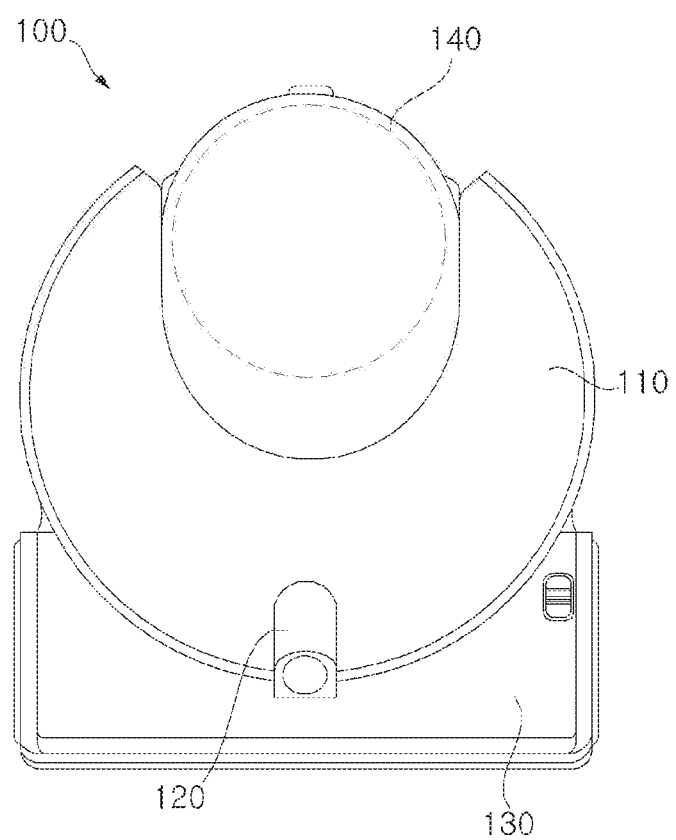
FIG. 2 is a plan view of the mobile robot of FIG. 1.
Figure 3:
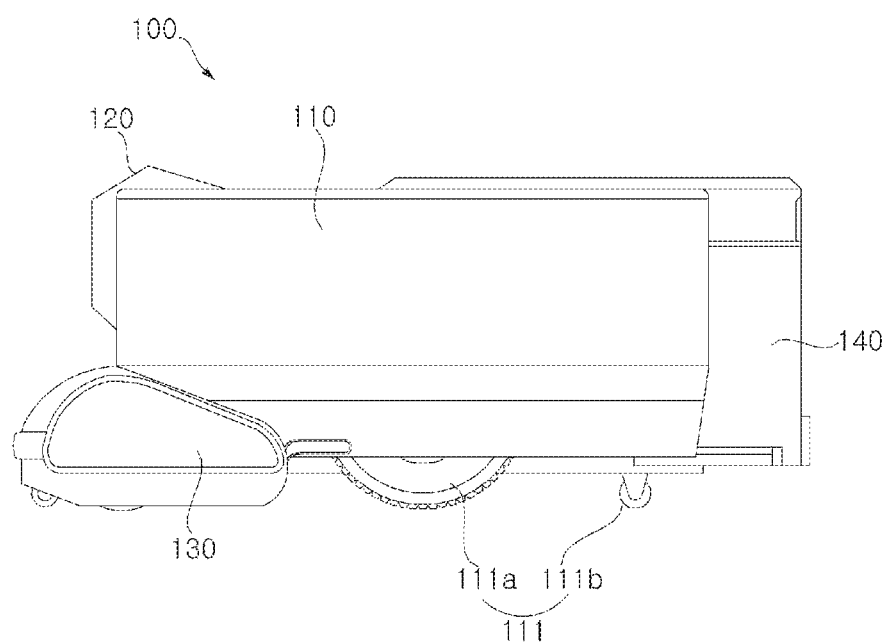
FIG. 3 is a side view of the mobile robot of FIG. 1.

FIG. 1 is a perspective view showing a mobile robot according to an embodiment of the present disclosure, FIG. 2 is a plan view of the mobile robot of FIG. 1, and FIG. 3 is a side view of the mobile robot of FIG. 1.

Referring to FIGS. 1 and 3, the mobile robot 100 may travel autonomously in a predetermined area. The mobile robot 100 may perform a floor cleaning function. Here, floor cleaning includes suctioning dust (including foreign matter) from a floor or mopping the floor.

The mobile robot 100 includes a main body 110. The main body 100 includes a cabinet that defines the external appearance thereof. The mobile robot 100 may include a suction unit 130 and a dust container 140 provided in the main body 110. The mobile robot 100 includes an image acquisition unit 120 for sensing information related to an environment around the mobile robot. The mobile robot 100 includes a traveling unit 160 for moving the main body. The mobile robot 100 includes a controller 150 for controlling the mobile robot 100. The controller 150 is provided in the main body 110.

The traveling unit 160 includes a wheel unit 111 for traveling of the mobile robot 100. The wheel unit 111 is provided in the main body 110. The mobile robot 100 may be moved forwards, rearwards, leftwards, and rightwards or may be turned by the wheel unit 111. The controller controls driving of the wheel unit 111, whereby the mobile robot 100 may travel autonomously on the floor. The wheel unit 111 includes main wheels 111a and a sub wheel 111b.

The main wheels 111a are provided at opposite sides of the main body 111 so as to be rotated in one direction or in the opposite direction according to a control signal of the controller. The main wheels 111a may be configured to be driven independently. For example, the main wheels 111a may be driven by different motors.

The sub wheel 111b is configured to support the main body 111 together with the main wheels 111a and to assist traveling of the mobile robot 100 by the main wheels 111a. The sub wheel 111b may also be provided in the suction unit 130, a description of which will follow.

The suction unit 130 may be disposed so as to protrude from the front F of the main body 110. The suction unit 130 is configured to suction air including dust.

The suction unit 130 may protrude from the front of the main body 110 to the left and right sides thereof. The front end of the suction unit 130 may be disposed at a position spaced apart from one side of the main body 110 in the forward direction. The left and right ends of the suction unit 130 may be disposed at positions spaced apart from the main body 110 in the leftward and rightward directions.

The main body 110 may be circular, and, since the opposite sides of the rear end of the suction unit 130 protrude from the main body 110 in the leftward and rightward directions, an empty space, i.e. a gap, may be formed between the main body 110 and the suction unit 130. The empty space is a space between the left and right ends of the main body 110 and the left and right ends of the suction unit 130, and is depressed inwardly of the mobile robot 100.

The suction unit 130 may be detachably coupled to the main body 110. When the suction unit 130 is separated from the main body 110, a mop module (not shown) may be detachably coupled to the main body 110 instead of the separated suction unit 130.

The image acquisition unit 120 may be disposed at the main body 110. The image acquisition unit 120 may be disposed at the front F of the main body 110. The image acquisition unit 120 may be disposed so as to overlap the suction unit 130 in the upward and downward directions of the main body 110. The image acquisition unit 120 may be disposed above the suction unit 130.

The image acquisition unit 120 may sense an obstacle around the mobile robot 100. The image acquisition unit 120 may sense an obstacle, a geographic feature, etc. in front of the mobile robot 100 such that the suction unit 130, which is located at the forefront of the mobile robot 100, is prevented from colliding with the obstacle. The image acquisition unit 120 may also perform a function other than the sensing function.

In addition, the image acquisition unit 120 of the mobile robot 100 according to the embodiment of the present disclosure may include a camera sensor disposed inclined relative to one surface of the main body 100 to capture a front image and an upper image. That is, both the front image and the upper image may be captured using a single camera sensor. In this case, the controller 150 may divide images captured and acquired by the camera into a front image and an upper image based on field of view. The separated front image may be used for vision-based object recognition. In addition, the separated upper image may be used for vision-based location recognition and traveling.

The mobile robot 100 according to the embodiment of the present disclosure may perform simultaneous localization and mapping (SLAM) of comparing a surrounding image with pre-stored image-based information or comparing acquired images with each other to recognize the current location.

A dust container reception unit (not shown) may be provided in the main body 110. The dust container 140, which separates dust from suctioned air and collects the separated dust, is detachably coupled to the dust container reception unit. The dust container reception unit may be formed in the rear R of the main body 110. A portion of the dust container 140 may be received in the dust container reception unit, and another portion of the dust container 140 may protrude toward the rear R of the main body 110.

The dust container 140 is provided with an inlet (not shown), through which air including dust is introduced, and an outlet (not shown), through which the air, from which the dust has been separated, is discharged. When the dust container 140 is mounted in the dust container reception unit, the inlet and the outlet of the dust container 140 may communicate respectively with a first opening (not shown) and a second opening (not shown) formed in the inner wall of the dust container reception unit.

A suction channel (not shown) for guiding air from a suction port of the suction unit 130 to the first opening is provided. An exhaust channel (not shown) for guiding air from the first opening to an exhaust port, which is open outside, is provided.

Air including dust introduced through the suction unit 130 is introduced into the dust container 140 through the suction channel in the main body 110, and passes through a filter or a cyclone of the dust container 140, by which the dust is separated from the air. The dust is collected in the dust container 140, and the air is discharged from the dust container 140, flows along the exhaust channel, and is finally discharged outside through the exhaust channel.

Figure 4:
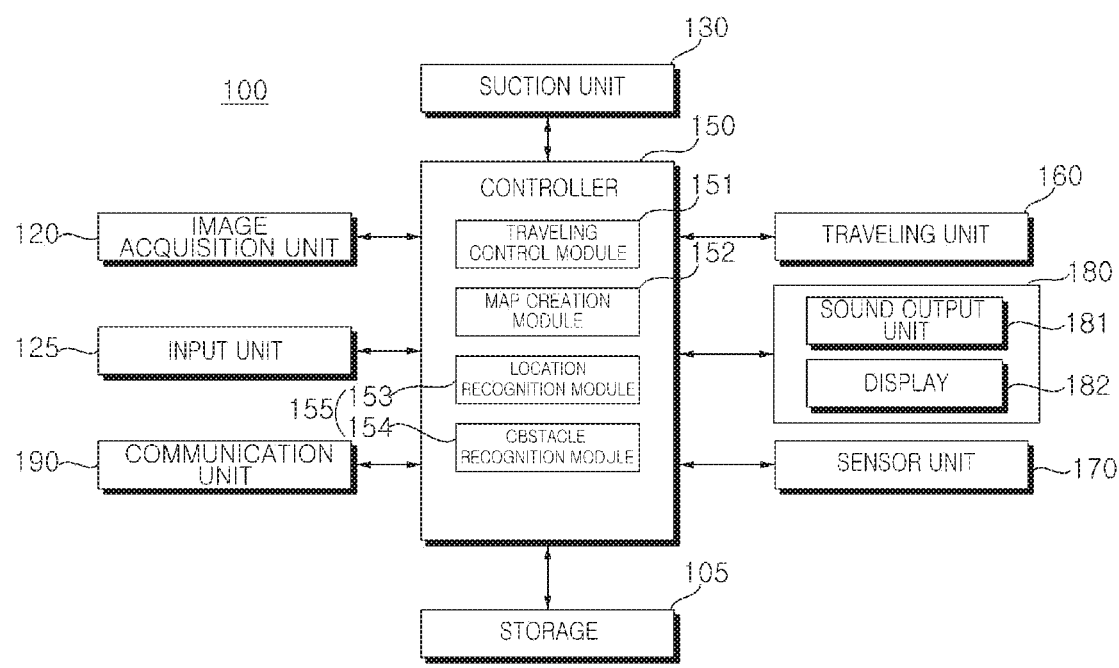
FIG. 4 is a block diagram showing a control relationship between main components of the mobile robot according to the embodiment of the present disclosure.

FIG. 4 is a block diagram showing a control relationship between main components of the mobile robot according to the embodiment of the present disclosure.

Referring to FIGS. 1 to 4, the mobile robot 100 includes a main body 110 and an image acquisition unit 120 for acquiring an image of the surroundings of the main body 110.

The mobile robot 100 includes a traveling unit 160 for moving the main body 110. The traveling unit 160 includes at least one wheel unit 111 for moving the main body 110. The traveling unit 160 includes a driving motor (not shown) connected to the wheel unit 111 to rotate the wheel unit 111.

The image acquisition unit 120 captures an image of a traveling zone, and may include a camera module. The camera module may include a digital camera. The digital camera may include at least one optical lens, an image sensor (e.g., a CMOS image sensor) including a plurality of photodiodes (e.g., pixels) for forming an image using light passing through the optical lens, and a digital signal processor (DSP) for forming an image based on a signal output from the photodiodes. The digital signal processor can create a moving image including frames composed of still images as well as a still image.

Several cameras may be installed at each portion of the mobile robot to improve capturing efficiency. Images captured by the camera may be used to recognize the kind of a material, such as dust, hair, or a floor, present in a corresponding space, to determine whether cleaning has been performed, or to determine when cleaning has been performed.

The camera may capture an obstacle present in front of the mobile robot 100 in the traveling direction thereof or the state of an area to be cleaned.

According to the embodiment of the present disclosure, the image acquisition unit 120 may continuously capture a plurality of images of the surroundings of the main body 110, and the acquired images may be stored in a storage 105.

The mobile robot 100 may use a plurality of images in order to improve accuracy in space recognition, location recognition, and obstacle recognition, or may select one or more from among a plurality of images in order to use effective data, thereby improving accuracy in space recognition, location recognition, and obstacle recognition.

In addition, the mobile robot 100 may include a sensor unit 170 including sensors for sensing various data related to the operation and state of the mobile robot.

For example, the sensor unit 170 may include an obstacle sensor for sensing an obstacle ahead. In addition, the sensor unit 170 may include a cliff sensor for sensing a cliff on the floor in the traveling zone and a lower camera sensor for acquiring a bottom image.

The obstacle sensor may include an infrared sensor, an ultrasonic sensor, an RF sensor, a geomagnetic sensor, and a position sensitive device (PSD) sensor.

Meanwhile, the location and kind of the sensors included in the obstacle sensor may be changed depending on the type of the mobile robot, and the obstacle sensor may include a wider variety of sensors.

Meanwhile, the sensor unit 170 may further include a traveling sensor for sensing the traveling state of the mobile robot 100 based on driving of the main body 110 and outputting operation information. A gyro sensor, a wheel sensor, or an acceleration sensor may be used as the traveling sensor. Data sensed by at least one of the traveling sensors or data calculated based on data sensed by at least one of the traveling sensors may constitute odometry information.

The gyro sensor senses the rotational direction of the mobile robot 100 and detects the rotational angle of the mobile robot 100 when the mobile robot 100 moves in an operation mode. The gyro sensor detects the angular velocity of the mobile robot 100, and output a voltage value proportional to the angular velocity. The controller 150 calculates the rotational direction and the rotational angle of the mobile robot 100 using the voltage value output from the gyro sensor.

The wheel sensor is connected to the wheel unit 111 to sense the number of rotations of the wheels. Here, the wheel sensor may be an encoder.

The controller 150 may calculate the rotational velocity of each of the left and right wheels using the number of rotations thereof. In addition, the controller 150 may calculate the rotational angle of each of the left wheel and the right wheel using the difference in the number of rotations therebetween.

The acceleration sensor senses a change in velocity of the mobile robot, for example, a change of the mobile robot 100 based on departure, stop, direction change, or collision with an object.

In addition, the acceleration sensor may be mounted in the controller 150 to sense a change in velocity of the mobile robot 100.

The controller 150 may calculate a change in location of the mobile robot 100 based on the operation information output from the traveling sensor. The location is a location relative to an absolute location using image information. The mobile robot may improve the performance of location recognition using image information and obstacle information through the relative location recognition.

Meanwhile, the mobile robot 100 may include a power supply (not shown) having a chargeable battery to supply power to the mobile robot.

The power supply may supply driving power and operating power to the respective components of the mobile robot 100, and may be charged with charge current from a charging station (not shown) in the case in which the remaining quantity of the battery is insufficient.

The mobile robot 100 may further include a battery sensor (not shown) for sensing the charged state of the battery and transmitting the result of sensing to the controller 150. The battery is connected to the battery sensor, and the remaining quantity and charged state of the battery are transmitted to the controller 150. The remaining quantity of the battery may be displayed on a display 182 of an output unit 180.

In addition, the mobile robot 100 includes an input unit 125 for allowing an ON/OFF command or various commands to be input. The input unit 125 may include a button, a dial, or a touchscreen. The input unit 125 may include a microphone for allowing a user voice instruction to be input therethrough. Various control commands necessary for overall operation of the mobile robot 100 may be input through the input unit 125.

In addition, the mobile robot 100 may include an output unit 180, and may visibly display or audibly output schedule information, a battery state, an operation mode, an operation state, or an error state through the output unit.

The output unit 180 may include a sound output unit 181 for outputting an audio signal. The sound output unit 181 may audibly output a notification message such as an alarm sound, an operation mode, an operation state, or an error state, under control of the controller 150. The sound output unit 181 may convert an electrical signal from the controller 150 into an audio signal, and may output the audio signal. To this end, a speaker may be provided.

In addition, the sound output unit 181 may further include a display 182 for visually displaying schedule information, a battery state, an operation mode, an operation state, or an error state.

Referring to FIG. 4, the mobile robot 100 include a controller 150 for processing and determining various kinds of information, for example, recognizing current location thereof, and a storage 105 for storing various kinds of data. In addition, the mobile robot 100 may further include a communication unit 190 for transmitting and receiving data to and from an external terminal.

The external terminal may have an application for controlling the mobile robot 100, may display a map of a traveling zone to be cleaned by the mobile robot 100 through execution of the application, and may designate a specific area to be cleaned on the map. Examples of the external terminal may include a remote controller equipped with an application for map setting, a PDA, a laptop computer, a smartphone, or a tablet computer.

The external terminal may communicate with the mobile robot 100 to display current location of the mobile robot together with the map, and display information about a plurality of areas. In addition, the external terminal displays updated location of the mobile robot depending on traveling thereof.

The controller 150 controls the image acquisition unit 120, the input unit 125, the traveling unit 160, and the suction unit 130, which constitute the mobile robot 100, thereby controlling overall operation of the mobile robot 100.

The controller 150 may perform a speech recognition process of processing a user speech input signal received through the microphone of the input unit 125. In some embodiments, the mobile robot 100 may have a speech recognition module for performing speech recognition inside or outside the controller 150.

In some embodiments, simple speech recognition may be performed by the mobile robot 100, and high-dimensional speech recognition, such as natural language processing, may be performed by a server 70.

The storage 105 stores various kinds of information necessary for controlling the mobile robot 100, and may include a volatile or non-volatile recording medium. The storage medium may store data that can be read by a microprocessor, and may include a hard disk drive (HDD), a solid-state disk (SSD), a silicon disk drive (SDD), a read-only memory (ROM), a random access memory (RAM), a compact disc read-only memory (CD-ROM), a magnetic tape, a floppy disk, and an optical data storage device.

In addition, the storage 105 may store a map of the traveling zone. The map may be input by an external terminal or a server capable of exchanging information with the mobile robot 100 through wired or wireless communication, or may be created by the mobile robot 100 through self-learning.

Locations of rooms in the traveling zone may be displayed on the map. In addition, current location of the mobile robot 100 may be displayed on the map, and the current location of the mobile robot 100 on the map may be updated during traveling. The external terminal stores a map identical to the map stored in the storage 105.

The storage 105 may store cleaning history information. The cleaning history information may be created whenever cleaning is performed.

The map about the traveling zone stored in the storage 105 is data in which predetermined information of the traveling zone is stored in a predetermined form, and may be a navigation map used for traveling during cleaning, a simultaneous localization and mapping (SLAM) map used for location recognition, a learning map using information stored and learned when the mobile robot collides with an obstacle, etc. at the time of cleaning, a global pose map used for global pose recognition, or an obstacle recognition map having information about recognized obstacles recorded therein.

The map may mean a node map including a plurality of nodes. Here, a node may mean data indicating any one location on a map corresponding to any one point in a traveling zone, and, in graph-based SLAM, a node may mean the pose of a robot. In addition, the pose may include location coordinate information (X, Y) and direction information $\theta$ in a coordinate system.

The node map may include node information, which is various data corresponding to each node. For example, the node information may include location information and image information acquired at a point corresponding to the node. The location information (X, Y, $\theta$) may include X coordinate information X, Y coordinate information Y, and direction information $\theta$ of the robot at a corresponding node. The direction information $\theta$ may also be referred to as angle information.

Meanwhile, the maps may not be clearly classified by purpose, although the maps may be partitioned by purpose, stored in the storage 105, and managed, as described above.

For example, a plurality of pieces of information may be stored in a single map so as to be used for at least two purposes.

The controller 150 may include a traveling control module 151, a map creation module 152, a location recognition module 153, and an obstacle recognition module 154.

Referring to FIGS. 1 to 4, the traveling control module 151 controls traveling of the mobile robot 100, and controls driving of the traveling unit 160 depending on traveling setting. In addition, the traveling control module 151 may determine the traveling path of the mobile robot 100 based on the operation of the traveling unit 160. For example, the traveling control module 151 may determine the current or past movement velocity, the traveling distance, etc. of the mobile robot 100 based on the rotational velocity of the wheel unit 111. The location of the mobile robot 100 on the map may be updated based on the determined traveling information of the mobile robot 100.

The map creation module 152 may create a map of a traveling zone. The map creation module 152 may process the image acquired through the image acquisition unit 120 to prepare a map. That is, the map creation module may prepare a cleaning map corresponding to a cleaning area.

In addition, the map creation module 152 may process an image acquired through the image acquisition unit 120 at each location and may connect the same to the map to recognize a global pose.

The location recognition module 153 estimates and recognizes the current location of the mobile robot. The location recognition module 153 may determine the location of the mobile robot in connection with the map creation module 152 using image information of the image acquisition unit 120, and may thus estimate and recognize the current location of the mobile robot even in the case in which the location of the mobile robot 100 is abruptly changed.

In addition, the location recognition module 153 may recognize the attributes of an area in which the mobile robot is currently located. That is, the location recognition module 153 may recognize a space.

The mobile robot 100 may perform location recognition through the location recognition module 153 during continuous traveling, and may learn a map and may estimate the current location thereof through the map creation module 152 and the obstacle recognition module 154 without the location recognition module 153.

During traveling of the mobile robot 100, the image acquisition unit 120 acquires images of the surroundings of the mobile robot 100. Hereinafter, an image acquired by the image acquisition unit 120 will be defined as an "acquisition image."

An acquisition image includes various features, such as lighting located at the ceiling, an edge, a corner, a blob, and a ridge.

The map creation module 152 detects features from each acquisition image, and calculates a descriptor based on each feature point. The descriptor means data in a certain format for indicating the feature point, and means mathematical data of a format capable of calculating distance or similarity between descriptors. For example, the descriptor may be an n-dimensional vector (n being a natural number) or data in a matrix format.

In addition, according to the embodiment of the present disclosure, the acquisition image may be divided into a plurality of blocks, and the feature may also be detected in the unit of a block. In addition, the descriptor may also be calculated based on the feature point detected at this time.

A feature and a descriptor detected from an acquisition image, which will be described hereinafter, may include a feature detected from a divided block-unit image and a descriptor based thereon.

The map creation module 152 may classify at least one descriptor for each acquisition image into a plurality of groups according to a predetermined sub-classification rule based on descriptor information obtained through an acquisition image of each location, and may convert descriptors included in the same group into sub-representation descriptors according to a predetermined sub-representation rule.

As another example, the map creation module may classify all descriptors collected from acquisition images in a predetermined zone, such as a room, into a plurality of groups according to the predetermined sub-classification rule, and may convert descriptors included in the same group into sub-representation descriptors according to the predetermined sub-representation rule.

The map creation module 152 may calculate feature distribution of each location through the above process. The feature distribution of each location may be expressed as a histogram or an n-dimensional vector. As another example, the map creation module 152 may estimate an unknown current location of the mobile robot based on the descriptor calculated from each feature point, not according to the predetermined sub-classification rule and the predetermined sub-representation rule.

Also, in the case in which the current location of the mobile robot 100 is unknown due to a location jump, the current location of the mobile robot may be estimated based on data, such as pre-stored descriptors or sub-representation descriptors.

The mobile robot 100 acquires an acquisition image through the image acquisition unit 120 at the unknown current location. Various features, such as lighting located at the ceiling, an edge, a corner, a blob, and a ridge, are identified through the image.

The location recognition module 153 detects features from the acquisition image, and calculates a descriptor.

The location recognition module 153 performs conversion into information (sub-recognition feature distribution) comparable with location information that becomes a comparison target (for example, feature distribution of each location) according to a predetermined sub-conversion rule based on information about at least one descriptor obtained through the acquisition image of the unknown current location.

The feature distribution of each location may be compared with the feature distribution of each recognition according to a predetermined sub-comparison rule to calculate similarity therebetween. Similarity (probability) by location corresponding to each location may be calculated, and the location having the greatest calculated probability may be determined to be the current location of the mobile robot. This similarity calculation may be performed in the unit of a block.

In this way, the controller 150 may divide a traveling zone to create a map including a plurality of areas, or may recognize the current location of the main body 110 based on a pre-stored map.

Upon creating the map, the controller 150 may transmit the created map to the external terminal or the server through the communication unit 190. In addition, upon receiving a map from the external terminal or the server, the controller 150 may store the map in the storage 105, as described above.

In this case, the cleaning area on the map may be divided into a plurality of areas, and the map may include a connection path for interconnecting the areas and information about obstacles in the areas.

When a cleaning command is input, the controller 150 determines whether the location on the map and the current location of the mobile robot coincide with each other. The cleaning command may be input from the remote controller, the input unit, or the external terminal.

In the case in which the current location does not coincide with the location on the map or in the case in which the current location cannot be confirmed, the controller 150 may recognize the current location to restore the current location of the mobile robot 100, and may control the traveling unit 160 to move to a designated area based on the current location.

In the case in which the current location does not coincide with the location on the map or in the case in which the current location cannot be confirmed, the location recognition module 153 may analyze the acquisition image input from the image acquisition unit 120 to estimate the current location based on the map. In addition, the obstacle recognition module 154 and the map creation module 152 may also recognize the current location in the same manner.

After restoring the current location of the mobile robot 100 through location recognition, the traveling control module 151 calculates a traveling path from the current location to the designated area, and controls the traveling unit 160 to move to the designated area.

Upon receiving cleaning pattern information from the server, the traveling control module 151 may divide the entire traveling zone into a plurality of areas according to the received cleaning pattern information, and may set at least one area to a designated area.

In addition, the traveling control module 151 may calculate a traveling path according to the received cleaning pattern information, and may perform cleaning while traveling along the traveling path.

When cleaning of the designated area is completed, the controller 150 may store a cleaning record in the storage 105.

In addition, the controller 150 may periodically transmit the operation state or the cleaning state of the mobile robot 100 to the external terminal or the server through the communication unit 190.

Accordingly, the external terminal displays the location of the mobile robot with the map on the screen of an application that is being executed based on received data, and outputs information about the cleaning state.

The mobile robot 100 according to the embodiment of the present disclosure moves in one direction until an obstacle or a wall is sensed, and when the obstacle recognition module 154 recognizes the obstacle, the mobile robot may decide a traveling pattern, such as straight movement or turning, based on the attributes of the recognized obstacle.

Meanwhile, the controller 150 may perform control such that evasive traveling is performed in different patterns based on the attributes of the recognized obstacle. The controller 150 may perform control such that evasive traveling in different patterns based on the attributes of the recognized obstacle, such as a non-dangerous obstacle (a general obstacle), a dangerous obstacle, and a movable obstacle.

For example, the controller 150 may perform control such that the mobile robot evades a dangerous obstacle by detouring in the state of securing a longer safety distance.

Also, in the case in which there is a movable obstacle and the obstacle does not move after a predetermined waiting time, the controller 150 may perform control such that evasive traveling corresponding to a general obstacle or evasive traveling corresponding to a dangerous obstacle is performed. Alternatively, in the case in which evasive traveling pattern corresponding to a movable obstacle is separately set, the controller 150 may perform control such that traveling is performed based thereon.

The mobile robot 100 according to the embodiment of the present disclosure may perform object recognition and evasion based on machine learning.

The controller 150 may include an obstacle recognition module 154 for recognizing an obstacle pre-learned based on machine learning in an input image and a traveling control module 151 for controlling driving of the traveling unit 160 based on the attributes of the recognized obstacle.

Meanwhile, although FIG. 4 shows an example in which a plurality of modules 151, 152, 153, and 154 is provided separately in the controller 150, the present disclosure is not limited thereto.

For example, the location recognition module 153 and the obstacle recognition module 154 may be combined into a single recognizer, and thus may be configured as a single recognition module. In this case, the recognizer may be trained using a learning method, such as machine learning, and the trained recognizer may classify data input thereafter to recognize the attributes of an area, an object, etc.

In some embodiments, the map generation module 152, the location recognition module 153, and the obstacle recognition module 154 may be configured as an integrated module.

Hereinafter, a description will be given based on an example in which the location recognition module 153 and the obstacle recognition module 154 are combined into a single recognizer and thus are configured as a single recognition module 155. Even in the case in which the location recognition module 153 and the obstacle recognition module 154 are provided individually, the operation may be performed in the same manner.

The mobile robot 100 according to the embodiment of the present disclosure may include a recognition module 155 that has learned the attributes of an obstacle or a space based on machine learning.

Machine learning means that computers learn through data without humans directly instructing logic to the computers and solves a problem for themselves based on learning.

Deep learning is artificial intelligence technology in which computers can learn for themselves, like humans, based on an artificial neural network (ANN) for constituting artificial intelligence without the humans teaching the computers using a method of teaching humans' way of thinking.

The artificial neural network (ANN) may be realized in the form of software or the form of hardware, such as a chip.

The recognition module 155 may include a software- or hardware-type artificial neural network (ANN) that has learned the attributes of a space or the attributes of an object, such as an obstacle.

For example, the recognition module 155 may include a deep neural network (DNN) that has been trained based on deep learning, such as a convolutional neural network (CNN), a recurrent neural network (RNN), or a deep belief network (DBN).

The recognition module 155 may determine the attributes of a space or an object included in input image data based on weights between nodes included in the deep neural network (DNN).

Meanwhile, the traveling control module 151 may control driving of the traveling unit 160 based on the attributes of the recognized space or obstacle.

Meanwhile, the recognition module 155 may recognize the attributes of a space or an obstacle included in the image selected at the specific point in time based on data pre-learned through machine learning.

Meanwhile, the storage 105 may store input data for discriminating the attributes of a space or an object and data for training the deep neural network (DNN).

The storage 105 may store the original image acquired by the image acquisition unit 120 and extracted images of predetermined areas.

In addition, in some embodiments, the storage 105 may store weights and biases constituting the structure of the deep neural network (DNN).

Alternatively, in some embodiments, the weights and biases constituting the structure of the deep neural network (DNN) may be stored in an embedded memory of the recognition module 155.

Meanwhile, whenever the image acquisition unit 120 acquires an image or extracts a portion of the image, the recognition module 155 may perform a learning process using a predetermined image as training data, or after a predetermined number or more of images are acquired, the recognition module may perform the learning process.

Alternatively, the mobile robot 100 may receive data related to machine learning from the predetermined server through the communication unit 190.

In this case, the mobile robot 100 may update the recognition module 155 based on the data related to machine learning received from the predetermined server.

Figure 5:
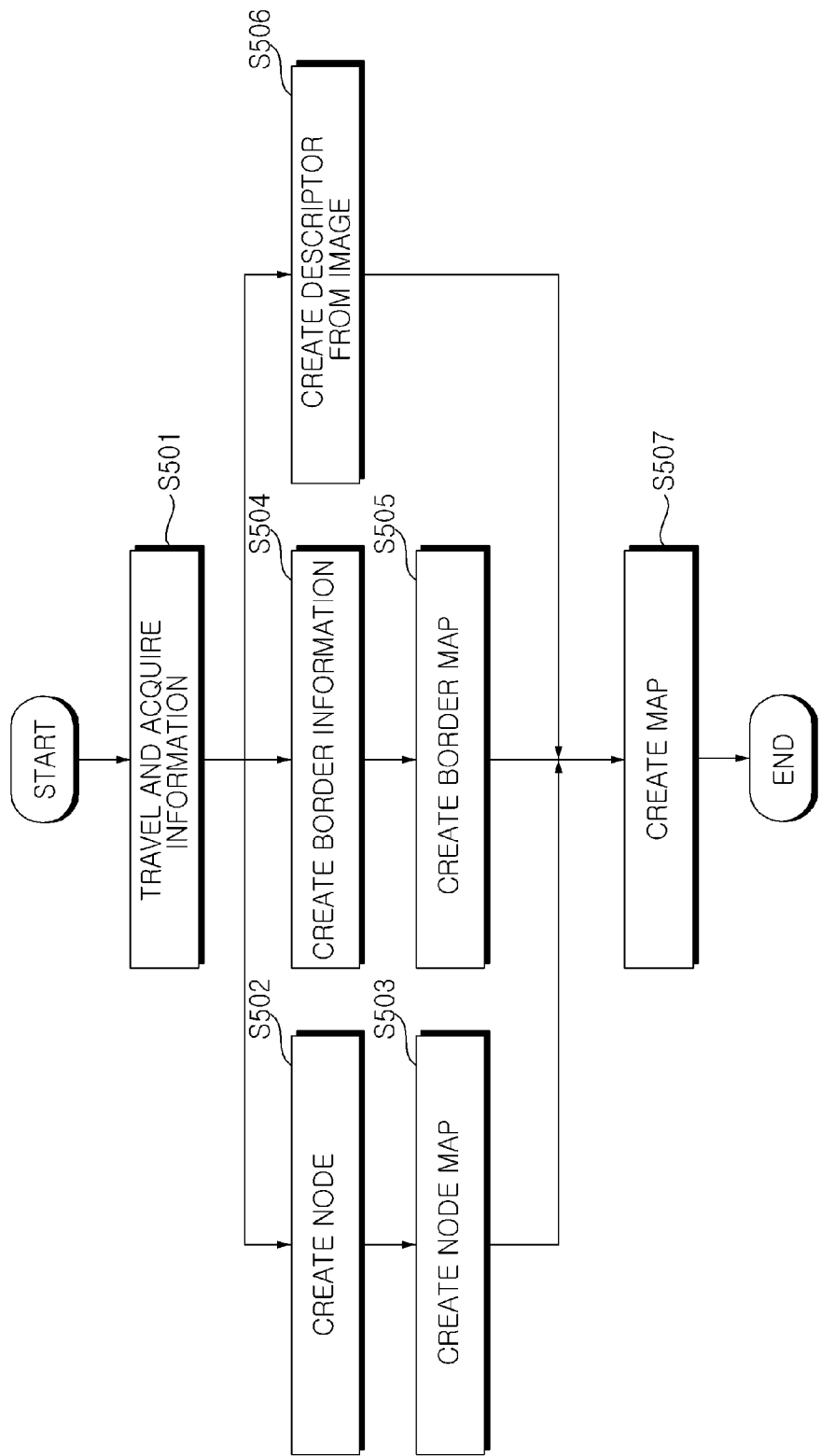
FIG. 5 is a flowchart showing a mobile robot control method according to an embodiment of the present disclosure.

FIG. 5 is a flowchart showing a mobile robot control method according to an embodiment of the present disclosure, which is a flowchart showing a map creation process, and FIGS. 6 to 9 are reference views illustrating the control method of FIG. 5.

Figure 6:
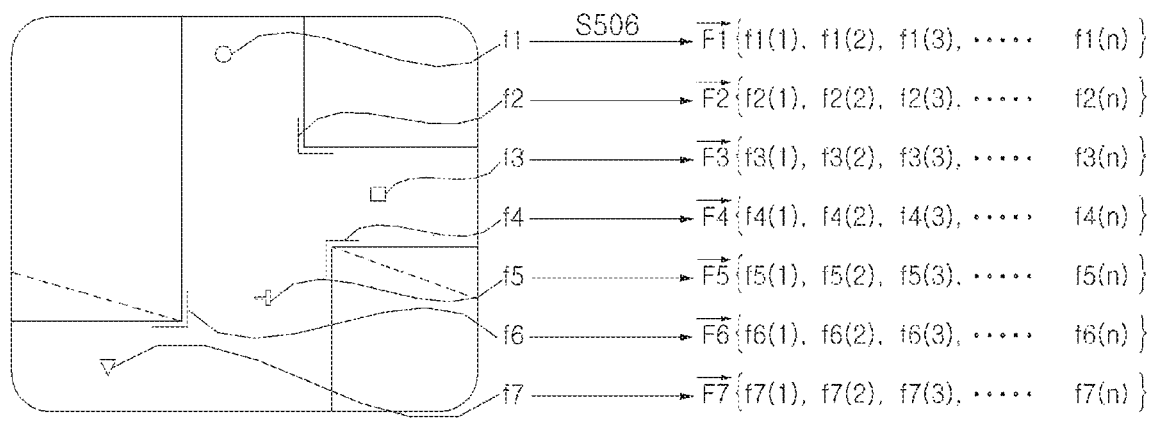
FIGS. 6 to 9 are reference views illustrating the control method of FIG. 5.
Figure 7:
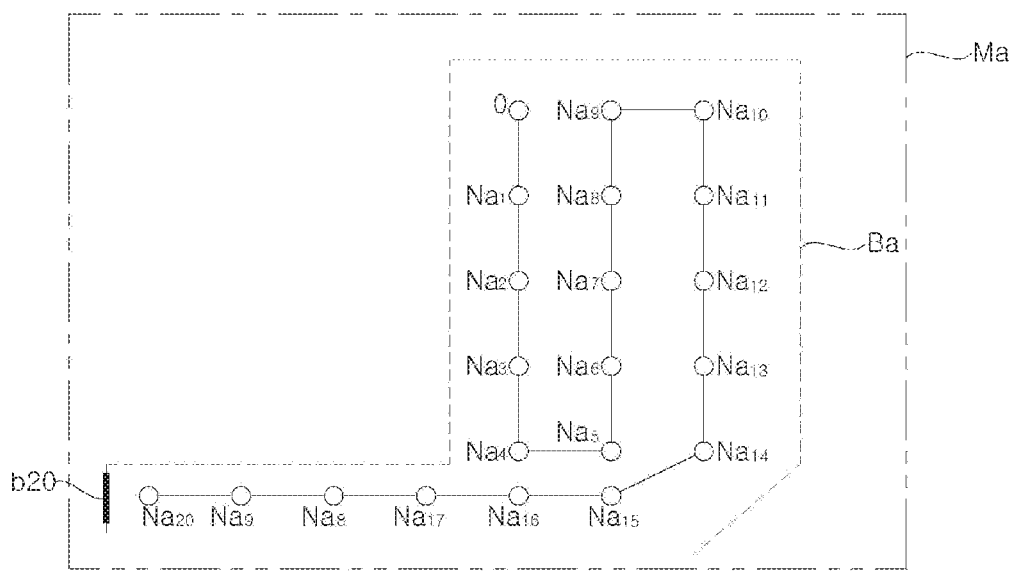

FIGS. 6 and 7 are conceptual views illustrating a traveling and information acquisition process (S501), a node creation process (S502), a node map creation process (S503), a border creation process (S504), a border map creation process (S505), and a descriptor creation process (S506) of FIG. 5.

FIG. 6 shows an image acquired in process S501 and a plurality of feature points f1, f2, f3, f4, f5, f6, and f7 in the image, and shows a diagram of creating descriptors $\vec{F1}$, $\vec{F2}$, $\vec{F3}$, ..., $\vec{F7}$, which are n-dimensional vectors corresponding to the feature points f1, f2, f3, ..., f7 respectively, in process 5606.

Referring to FIGS. 6 and 7, in the information acquisition process (S501), the image acquisition unit 120 acquires an image at each point during traveling of the mobile robot 100. For example, the image acquisition unit 120 may perform capturing toward the upper side of the mobile robot 100 to acquire an image of a ceiling, etc.

Also, in the information acquisition process (S501), a traveling obstacle factor may be sensed using the sensor unit 170, the image acquisition unit 120, or other well-known means during traveling of the mobile robot 100.

The mobile robot 100 may sense a traveling obstacle factor at each point. For example, the mobile robot may sense the outer surface of a wall, which is one of the traveling obstacle factors, at a specific point.

Referring to FIGS. 6 and 7, in the node generation process (S502), the mobile robot 100 creates a node corresponding to each point. Coordinate information corresponding to a node Na18, Na19, or Na20 may be created based on the traveling displacement measured by the mobile robot 100.

Traveling displacement is a concept including the moving direction and the moving distance of the mobile robot. Assuming that the floor surface in the traveling zone is in a plane in which X and Y axes are orthogonal, the traveling displacement may be expressed as $(\Delta x, \Delta y, \theta)$. $\Delta x, \Delta y$ may represent displacement in X-axis and Y-axis directions, and $\theta$ may represent a rotational angle.

The controller 150 may measure the traveling displacement of the mobile robot 100 based on the operation of the traveling unit 160. For example, the traveling control module 151 may measure the current or past movement velocity, the traveling distance, etc. of the mobile robot 100 based on the rotational speed of the wheel unit 111, and may also measure the current or past direction change process based on the rotational direction of the wheel unit 111.

In addition, the controller 150 may measure the traveling displacement using data sensed by the sensor unit 170.

Referring to FIGS. 6 and 7, in the border creation process (S504), the mobile robot 100 creates border information b20 corresponding to a traveling obstacle factor. In the border information creation process (S504), the mobile robot 100 may create border information corresponding to each traveling obstacle factor. A plurality of traveling obstacle factors may achieve one-to-one correspondence to a plurality of pieces of border information. The border information b20 may be created based on coordinate information of a corresponding node and a distance value measured by the sensor unit 170.

Referring to FIGS. 6 and 7, the node map creation process (S503) and the border map creation process (S505) are performed simultaneously. On the node map creation process (S503), a node map including a plurality of nodes Na18, Na19, Na20, and the like is created. In the border map creation process (S505), a border map Ba including a plurality of pieces of border information b20 and the like is created. A map Ma including the node map and the border map Ba is created on the node map creation process (S503) and the border map creation process (S505). FIG. 6 shows a map Ma being created through the node map creation process (S503) and the border map creation process (S505).

In the image shown in FIG. 6, various feature points, such as lighting located in the ceiling, an edge, a corner, a blob, and a ridge, are identified. The mobile robot 100 extracts feature points from an image. Various feature detection methods of extracting feature points from an image are well known in the field of computer vision. Various feature detectors suitable for extracting these feature points are known. For example, there are Canny, Sobel, Harris & Stephens/Plessey, SUSAN, Shi & Tomasi, Level curve curvature, FAST, Laplacian of Gaussian, Difference of Gaussians, Determinant of Hessian, MSER, PCBR, and Gray-level blobs detector.

In addition, the feature point extraction may be performed based on point, or may be performed in the unit of a block.

Referring to FIG. 6, in the descriptor creation process (S506), descriptors $\vec{F1}$, $\vec{F2}$, $\vec{F3}$, ..., $\vec{F7}$ are created based on a plurality of feature points f1, f2, f3, ..., f7 extracted from the acquired image. In the descriptor creation process (S506), descriptors $\vec{F1}, \vec{F2}, \vec{F3}, \ldots, \vec{Fm}$ are created based on a plurality of feature points f1, f2, f3, . . . , fm extracted from a plurality of acquired images (where m is a natural number). A plurality of feature points f1, f2, f3, . . . , fm achieves one-to-one correspondence to a plurality of descriptors $\vec{F1}, \vec{F2}, \vec{F3}, \ldots, \vec{Fm}$.

$\vec{F1}, \vec{F2}, \vec{F3}, \ldots, \vec{Fm}$ mean n-dimensional vectors. f1(1), f1(2), f1(3), . . . , f1(n) in curly brackets { } of $\vec{F1}$ mean the numerical values of each dimension forming $\vec{F1}$. Since the notation for the rest $\vec{F2}, \vec{F3}, \ldots, \vec{F7}$ has the same method, a description thereof will be omitted.

A plurality of descriptors $\vec{F1}, \vec{F2}, \vec{F3}, \ldots, \vec{Fm}$ corresponding to a plurality of feature points f1, f2, f3, . . . , fm may be created, by using scale invariant feature transform (SIFT) technology for feature detection.

For example, after choosing the feature points f1, f2, f3, f4, f5, f6, and f7, which are easy to identify in the image, by applying the SIFT technology, it is possible to create a descriptor that is an n-dimensional vector based on the distribution characteristics (the direction in which brightness is changed and the abrupt degree of change) of a brightness gradient of pixels belonging to a certain area around each feature point f1, f2, f3, f4, f5, f6, or f7. Here, the direction of each brightness change of the feature point may be regarded as each dimension, and it is possible to create an n-dimensional vector (descriptor) in which the abrupt degree of change in the direction of each brightness change is a numerical value for each dimension. SIFT may detect invariant features with respect to the scale, rotation, and brightness change of an object to be captured, and thus may detect invariant features (i.e. a rotation-invariant feature) even when the same area is captured while the pose of the mobile robot 100 is changed. Of course, the present disclosure is not limited thereto, and various other methods (for example, HOG: Histogram of Oriented Gradients, Haar feature, Fems, LBP: Local Binary Pattern, and MCT: Modified Census Transform) may be applied.

Meanwhile, a descriptor, which is a dimensional vector, may be created in the unit of a block. For example, it is possible to create an n-dimensional descriptor based on the distribution characteristics (the direction in which brightness is changed and the abrupt degree of change) of a brightness gradient of the blocks.

Figure 8:
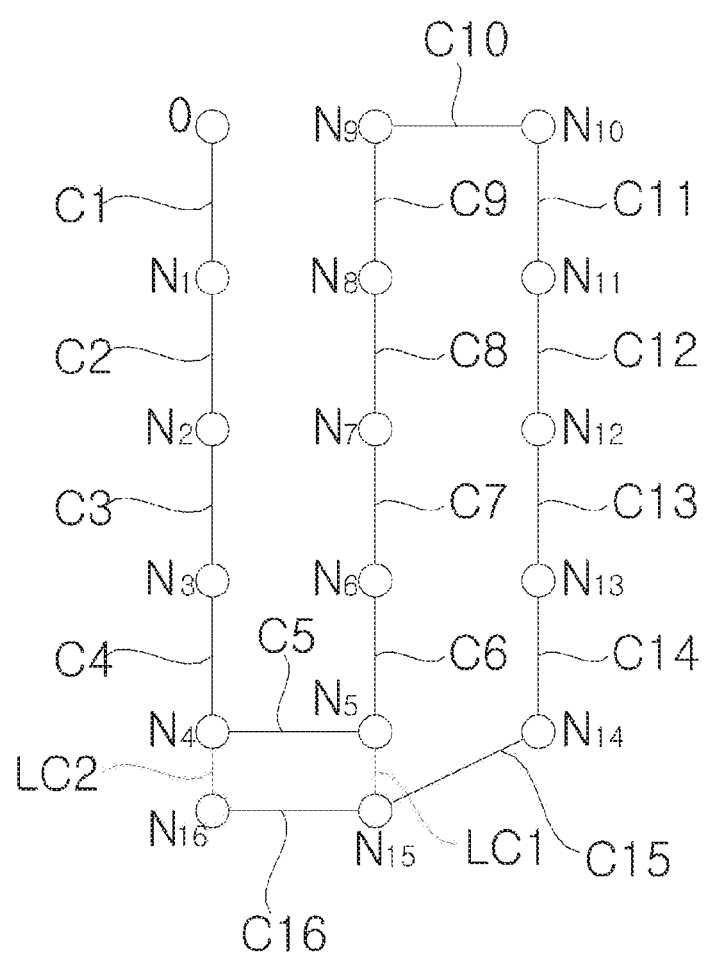

FIG. 8 is a conceptual view showing a plurality of nodes N created by the mobile robot during movement and displacement C between the nodes.

Referring to FIG. 8, traveling displacement C1 is measured while the origin node O is set, and information of a node N1 is created. Traveling displacement C2 that is measured afterwards may be added to coordinate information of the node N1 which is the starting point of the traveling displacement C2 in order to create coordinate information of a node N2 which is the end point of the traveling displacement C2. Traveling displacement C3 is measured in the state in which the information of the node N2 is created, and information of a node N3 is created. Information of nodes N1, N2, N3, . . . , N16 is sequentially created based on traveling displacements C1, C2, C3, . . . , C16 that are sequentially measured as described above.

When defining a node C15 which is the starting point of any one traveling displacement C15 as a 'base node' of the node 16 which is the end point of a corresponding traveling displacement C15, loop displacement (Loop Constraint: LC) means a measured value of displacement between any one node N15 and another adjacent node N5 which is not the 'base node N14' of the node N15.

As an example, acquisition image information corresponding to any one node N15 and acquisition image information corresponding to the other adjacent node N5 may be compared with each other such that the loop displacement (LC) between two nodes N15 and N5 can be measured. As another example, the distance information between any one node N15 and the surrounding environment thereof may be compared with the distance information between the other adjacent node N5 and the surrounding environment thereof such that the loop displacement (LC) between the two nodes N15 and N5 can be measured. FIG. 8 illustrates loop displacement LC1 measured between the node N5 and the node N15, and loop displacement LC2 measured between the node N4 and the node N16.

Information of any one node N5 created based on the traveling displacement may include node coordinate information and image information corresponding to the node. When the node N15 is adjacent to the node N5, image information corresponding to the node N15 may be compared with the image information corresponding to the node N5 to measure the loop displacement LC1 between the two nodes N5 and N15. When the 'loop displacement LC1' and the 'displacement calculated according to the previously stored coordinate information of the two nodes N5 and N15' are different from each other, it is possible to update the coordinate information of the two nodes N5 and N15 by considering that there is an error in the node coordinate information. In this case, coordinate information of the other nodes N6, N7, N8, N9, N10, N11, N12, N13, and N14 connected to the two nodes N5 and N15 may also be updated. In addition, the node coordinate information, which is updated once, may be continuously updated through the above process.

This will be described in more detail as follows. It is assumed that two nodes (N) having measured loop displacement LC therebetween are a first loop node and a second loop node, respectively. A difference ($\Delta x1 - \Delta x2$, $\Delta y1 - \Delta y2$, $\theta_1 - \theta2$) between the 'calculated displacement ($\Delta x1, \Delta y1, \theta1$)' (calculated by a difference between coordinate values) calculated by the previously stored node coordinate information of the first loop node and the previously stored node coordinate information of the second loop node and the loop displacement LC ($\Delta x2$, $\Delta y2$, $\theta2$) may occur. When the difference occurs, the node coordinate information may be updated by considering the difference as an error. The node coordinate information is updated on the assumption that the loop displacement LC is more accurate than the calculated displacement.

In the case of updating the node coordinate information, only the node coordinate information of the first loop node and the second loop node may be updated. However, since the error occurs by accumulating the errors of the traveling displacements, it is possible to disperse the error and to set the node coordinate information of other nodes to be updated. For example, the node coordinate information may be updated by distributing the error values to all the nodes created by the traveling displacement between the first loop node and the second loop node. Referring to FIG. 8, when the loop displacement LC1 is measured and the error is calculated, the error may be dispersed to the nodes N6 to N14 between the first loop node N15 and the second loop node N5 such that all the node coordinate information of the nodes N5 to N15 may be updated little by little. Of course, it is also possible to update the node coordinate information of the other nodes N1 to N4 by expanding the error dispersion.

Figure 9:
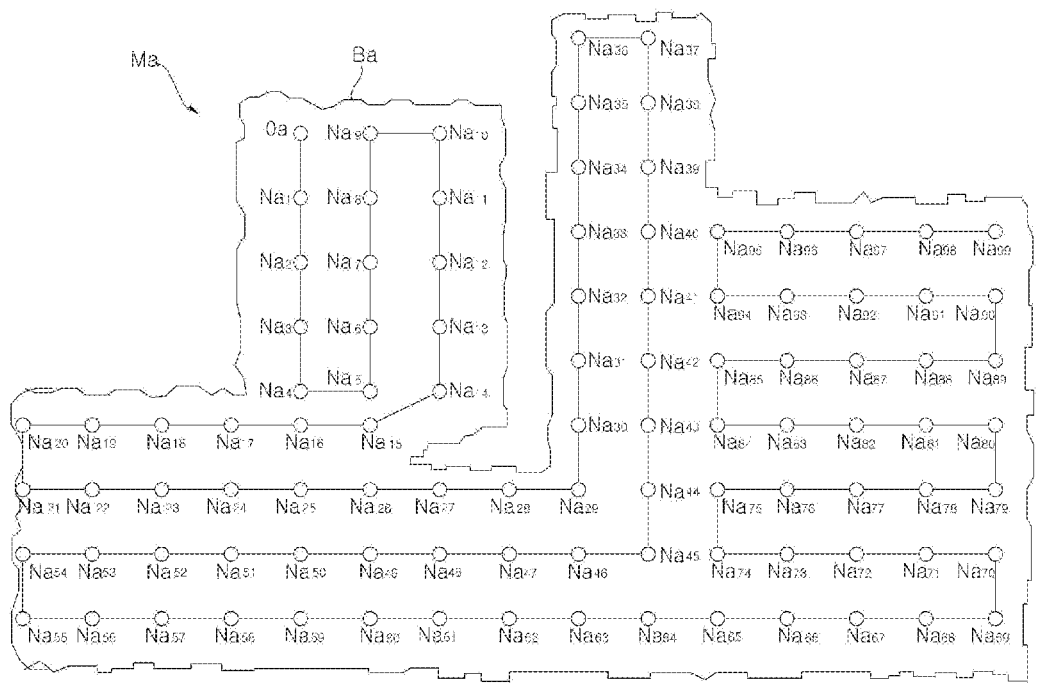

FIG. 9 is a conceptual view showing an example of the first map Ma, and is a view including a created node map. FIG. 9 shows an example of any one map Ma created through the map creation step of FIG. 5. The map Ma may include a node map and a border map Ba. The node map may include a plurality of first nodes Na1 to Na99.

Referring to FIG. 9, any one map Ma may include node maps Na1, Na2, . . . , Na99 and a border map Ba. A node map refers to information consisting of a plurality of nodes among various kinds of information in a single map, and a border map refers to information consisting of a plurality of pieces of border information among various kinds of information in a single map. The node map and the border map are elements of the map, and the processes of creating the node map (S502 and S503) and the processes of creating the border map (S504 and S505) are performed simultaneously. For example, border information may be created based on pre-stored coordinate information of a node corresponding to a specific point, after measuring the distance between the traveling obstacle factor and the specific point. For example, the node coordinate information of the node may be created based on pre-stored border information corresponding to a specific obstacle factor, after measuring the distance between the specific point and the specific obstacle. As for the node and border information, one may be created on the map based on the relative coordinates of one with respect to the other stored previously.

In addition, the map may include image information created in process S506. A plurality of nodes achieves one-to-one correspondence to a plurality of image information. Specific image information corresponds to a specific node.

FIGS. 10 to 13 are reference views illustrating location recognition according to an embodiment of the present disclosure.

A recognition image acquisition process and a recognition descriptor creation process will be described in detail with reference to FIG. 10.

In the case in which the current location of the mobile robot 100 is unknown due to a location jump, the recognition image acquisition process is commenced. The image acquisition unit 120 acquires a recognition image at the unknown current location. Alternatively, the recognition image acquisition process is commenced for current location recognition during traveling of the mobile robot 100.

The recognition image may be an image of the upper side of the mobile robot. The recognition image may be an image of a ceiling. The image shown in FIG. 10 is a recognition image corresponding to the current point.

Figure 10:
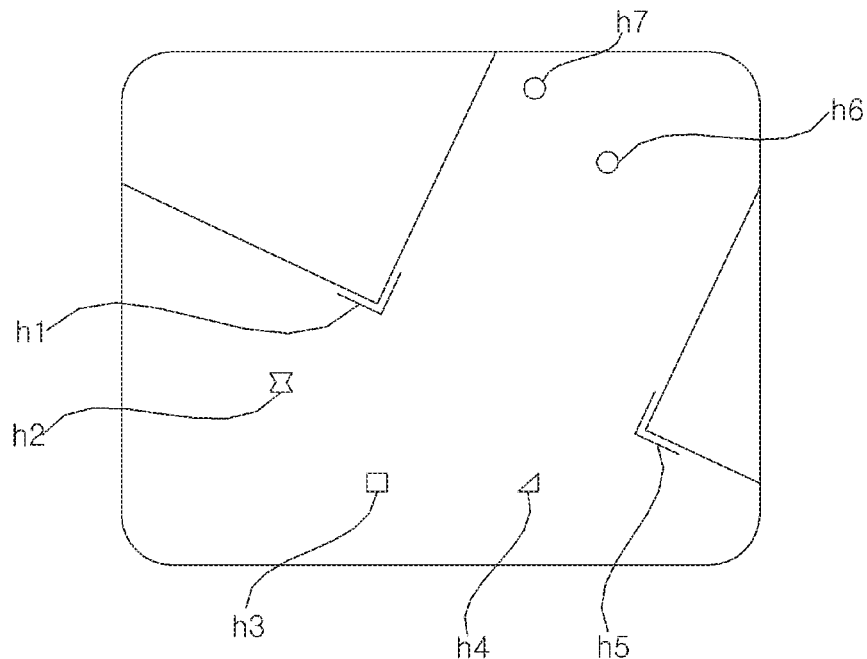

Referring to FIG. 10, a plurality of recognition descriptors $\vec{H1}, \vec{H2}, \vec{H3}, \ldots, \vec{H7}$ is created based on a plurality of recognition feature points h1, h2, h3, . . . , h7 extracted from the recognition image. A plurality of recognition feature points hl, h2, h3, . . . , h7 achieves one-to-one correspondence to a plurality of recognition descriptors $\vec{H1}, \vec{H2}, \vec{H3}, \ldots, \vec{H7}$.

In FIG. 10, $\vec{H1}, \vec{H2}, \vec{H3}, \ldots, \vec{H7}$ mean n-dimensional vectors. h1(1), h1(2), h1(3), . . . , h1(n) in curly brackets { } of $\vec{H1}$ mean the numerical values of each dimension forming $\vec{H1}$. Since the notation for the rest $\vec{H2}, \vec{H3}, \ldots, \vec{H7}$ has the same method, a description thereof will be omitted.

A plurality of recognition descriptors $\vec{H1}, \vec{H2}, \vec{H3}, \ldots, \vec{H7}$ corresponding to a plurality of recognition feature points h1, h2, h3, . . . , h7 may be created, by using the SIFT technology for feature detection. Various methods of detecting features from an image in the field of computer vision and various feature detectors suitable for feature detection have been described above.

A feature point (or descriptor) matching process will be described in detail with reference to FIG. 11. In the matching process, a plurality of recognition descriptors $\vec{H1}, \vec{H2}, \vec{H3}, \ldots, \vec{H7}$ in the recognition image is matched with a plurality of global label descriptors closest thereto. In FIG. 10, a correspondence relationship between the recognition descriptors and the global label descriptors is shown using matching lines. When the matching process (S231) is performed, a plurality of global label descriptors $\vec{XF1}, \vec{XF2}, \vec{XF3}, \ldots, \vec{XF53}$ achieves one-to-one correspondence to a plurality of recognition descriptors $\vec{H1}, \vec{H2}, \vec{H3}, \ldots, \vec{H7}$.

For example, the global label descriptor closest to the recognition descriptor $\vec{H1}$ is $\vec{XF3}$, and the global label descriptor $\vec{XF3}$ corresponds to the recognition descriptor $\vec{H1}$. The global label descriptor closest to the recognition descriptors $\vec{H2}, \vec{H4}$ is $\vec{XF1}$, and the global label descriptor $\vec{XF1}$ corresponds to the recognition descriptors $\vec{H2}, \vec{H4}$. The global label descriptor closest to the recognition descriptors $\vec{H3}, \vec{H5}, \vec{H7}$ is $\vec{XF5}$, and the global label descriptor $\vec{XF5}$ corresponds to the recognition descriptors $\vec{H3}, \vec{H5}, \vec{H7}$. The global label descriptor closest to the recognition descriptor $\vec{H6}$ is $\vec{XF32}$, and the global label descriptor $\vec{XF32}$ corresponds to the recognition descriptor $\vec{H6}$. In this case, the global label descriptors matched with the recognition descriptors $\vec{H1}, \vec{H2}, \vec{H3}, \ldots, \vec{H7}$, among all global label descriptors $\vec{XF1}, \vec{XF2}, \vec{XF3}, \ldots, \vec{XF53}$ in the whole area x, are $\vec{XF1}, \vec{XF3}, \vec{XF5}, \vec{XF32}$. In FIG 11, groups XG1, XG3, XG5, and XG32, based on which the matched global label descriptors $\vec{XF1}, \vec{XF3}, \vec{XF5}, \vec{XF32}$ are created, are marked.

Figure 12:
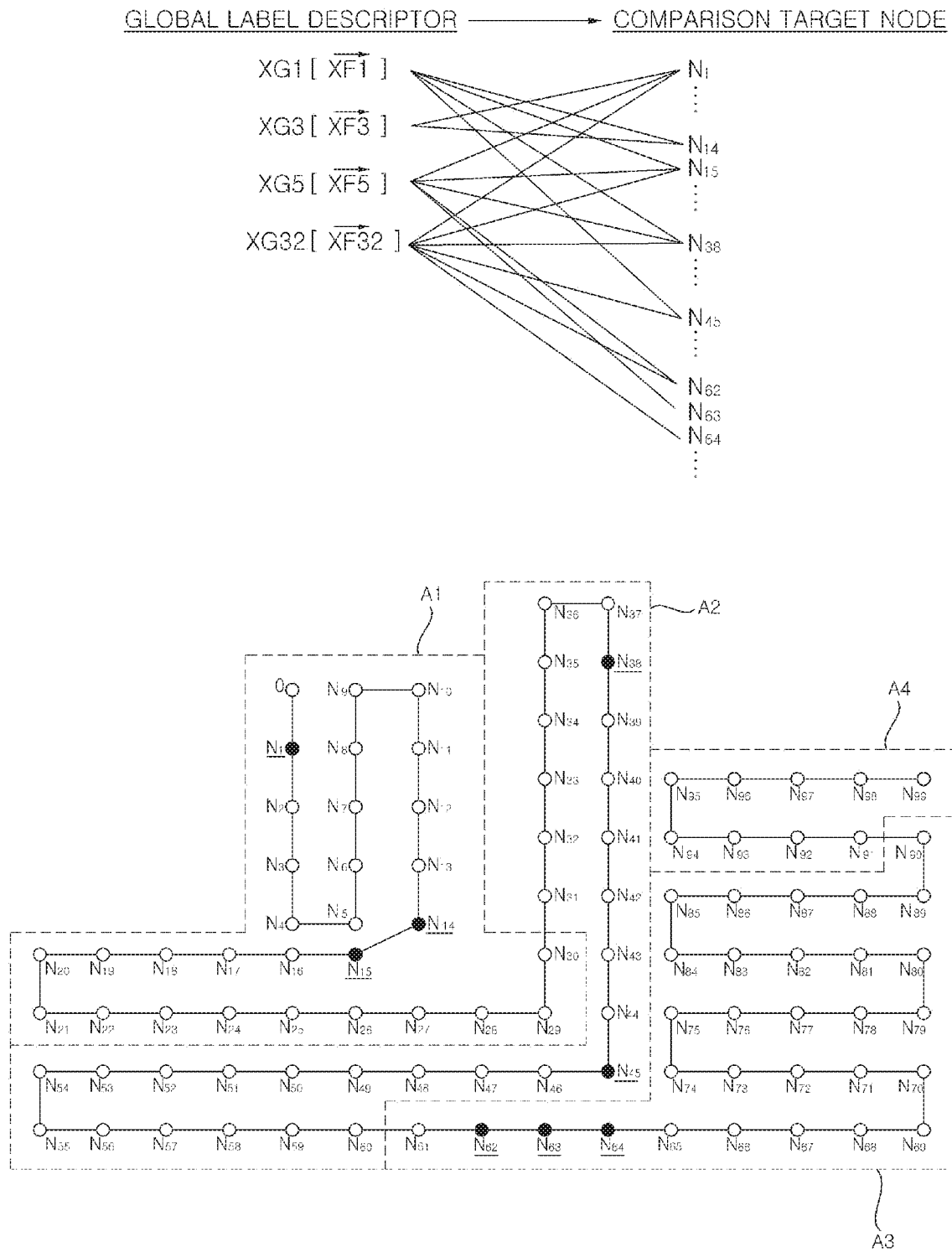

A comparison target node selection process will be described in detail with reference to FIG. 12. In the comparison target node selection process, comparison target nodes corresponding to the matched global label descriptors $\vec{XF1}, \vec{XF3}, \vec{XF5}, \vec{XF32}$ are selected. A plurality of nodes achieves one-to-one correspondence to the matched global label descriptors $\vec{XF1}, \vec{XF3}, \vec{XF5}, \vec{XF32}$.

For example, the comparison target nodes corresponding to the matched global label descriptors $\vec{XF1}, \vec{XF3}, \vec{XF5}, \vec{XF32}$ are N1, N14, N15, N38, N62, N63, and N64. A plurality of global label descriptors in each of the selected comparison target nodes N1, N14, N15, N38, N62, N63, and N64 may include at least one of the matched global label descriptors $\vec{XF1}, \vec{XF3}, \vec{XF5}, \vec{XF32}$. A plurality of global label descriptors in the rest nodes that have not been selected does not include all of the matched global label descriptors $\overrightarrow{XF1}, \overrightarrow{XF3}, \overrightarrow{XF5}, \overrightarrow{XF32}$.

Specifically, descriptors, based on which the matched global label descriptors $\overrightarrow{XF1}, \overrightarrow{XF3}, \overrightarrow{XF5}, \overrightarrow{XF32}$ are created, are selected, images, based on which the selected descriptors are created, are selected, and nodes corresponding to the selected images become comparison target nodes.

For example, in the case in which any one descriptor A is classified as a group A1G1 according to a predetermined classification rule (a first predetermined classification rule), a local label descriptor B is created based on descriptors in the group A1G1 according to a predetermined label rule (a first predetermined label rule), the local label descriptor B is classified as a group XG5 according to a predetermined classification rule (a second predetermined classification rule), and a global label descriptor C is created based on local label descriptors in the group XG5 according to a predetermined label rule (a second predetermined label rule), it is expressed that 'the descriptor A is a basis of creation of the global label descriptor C'. In addition, in the case in which the descriptor A is present in a plurality of descriptors in an image D, it is expressed that 'the image D is a basis of creation of the descriptor A'. Furthermore, it is expressed that 'the image D is a basis of creation of the global label descriptor C'.

In the selection process, images that are bases of creation of the matched global label descriptors $\overrightarrow{XF1}, \overrightarrow{XF3}, \overrightarrow{XF5}, \overrightarrow{XF32}$ are selected from among a plurality of images, and comparison target nodes one-to-one corresponding to the selected images are selected from among all nodes. In FIG. 12, the selected comparison target nodes N1, N14, N15, N38, N62, N63, and N64 are shown as black dots.

An example of a comparison process by comparison target node will be described with reference to FIG. 13. In the comparison process, only images corresponding to the comparison target nodes N1, N14, N15, N38, N62, N63, and N64 selected in the selection process are compared with the recognition image. As the result of comparison, a comparison target node corresponding to the image having the most highly calculated similarity is selected as a final node.

In the comparison process, for only the comparison target nodes N1, N14, N15, N38, N62, N63, and N64 selected in the selection process, image feature distribution (for example, an image feature distribution vector) corresponding to each of the nodes N1, N14, N15, N38, N62, N63, and N64 is created. Also, in the comparison process, recognition image feature distribution (for example, a recognition image feature distribution vector) comparable with the image feature distribution of each of the comparison target nodes N1, N14, N15, N38, N62, N63, and N64 is created. In the comparison process, the image feature distribution and the recognition image feature distribution are compared with each other for each of the comparison target nodes N1, N14, N15, N38, N62, N63, and N64, and a node having the highest similarity is selected as a final node (a node estimated as the current point).

Figure 13:
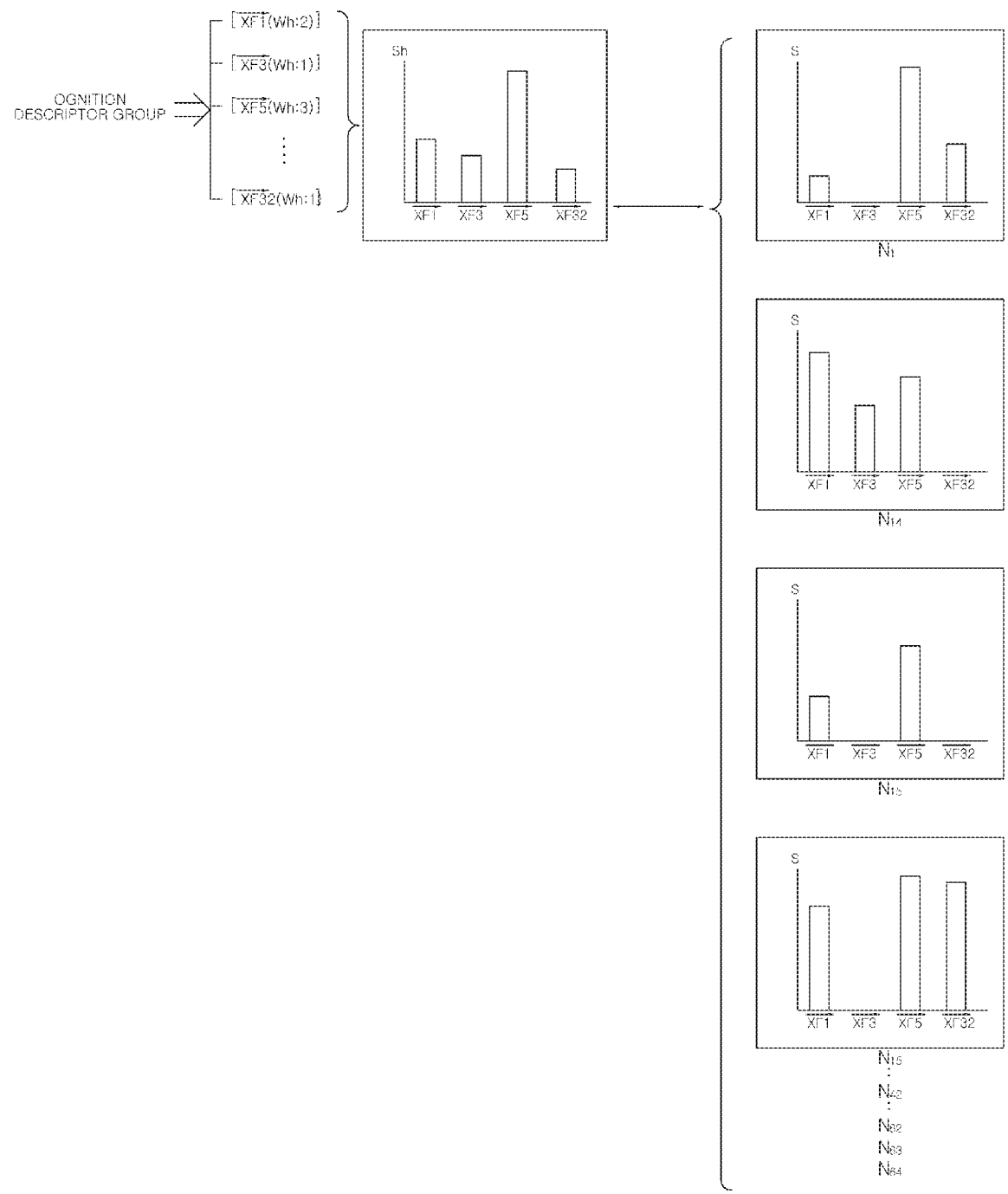

In FIG. 13, the left histogram is an example of the recognition image feature distribution histogram. The recognition image feature distribution is created based on the matched global label descriptors $\overrightarrow{XF1}, \overrightarrow{XF3}, \overrightarrow{XF5}, \overrightarrow{XF32}$. A recognition score Sh of each of the matched global label descriptors $\overrightarrow{XF1}, \overrightarrow{XF3}, \overrightarrow{XF5}, \overrightarrow{XF32}$ may be calculated using a predetermined mathematical expression.

In FIG. 13, the right histogram is an example of the image feature distribution histogram by comparison target node. The image feature distribution is created based on the matched global label descriptors $\overrightarrow{XF1}, \overrightarrow{XF3}, \overrightarrow{XF5}, \overrightarrow{XF32}$. A recognition score Sh of each of the matched global label descriptors $\overrightarrow{XF1}, \overrightarrow{XF3}, \overrightarrow{XF5}, \overrightarrow{XF32}$ may be calculated using a predetermined mathematical expression.

The image feature distribution of any one comparison target node may be expressed as an image feature distribution histogram having the kind of each global label descriptor as a representative value (a value on the horizontal axis) and a score s calculated based on weight w per kind as a frequency (a value on the vertical axis).

Meanwhile, the global label descriptors in the image may include a global label descriptor $\overrightarrow{XF17}$ other than the matched global label descriptors $\overrightarrow{XF1}, \overrightarrow{XF3}, \overrightarrow{XF5}, \overrightarrow{XF32}$. It is not necessary for the global label descriptor $\overrightarrow{XF17}$ to be a representative value of the image feature distribution histogram. However, the weight of the global label descriptor $\overrightarrow{XF17}$ may affect the score s of each of the matched global label descriptors $\overrightarrow{XF1}, \overrightarrow{XF3}, \overrightarrow{XF5}, \overrightarrow{XF32}$.

After the comparison process, a node estimated as the current location may be selected from among the comparison target nodes. In the comparison process, the recognition image feature distribution is compared with the image feature distribution by comparison target node, and a node having the highest similarity is selected. Here, a location corresponding to the selected node having the highest similarity becomes the current location.

Meanwhile, the node having the highest similarity may be selected in the unit of a block.

Figure 14:
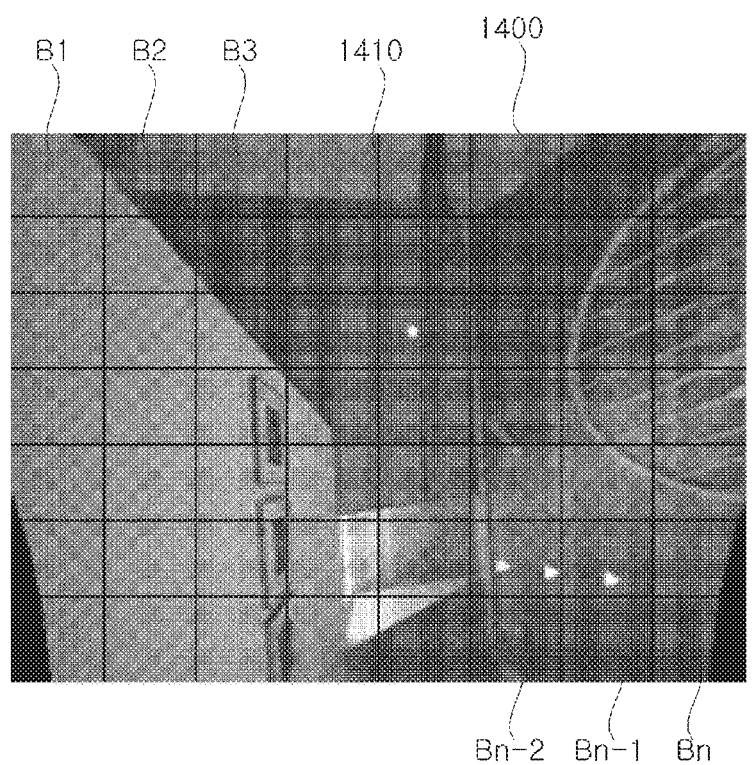
FIGS. 14 and 15 are reference views illustrating block-unit feature extraction and matching according to an embodiment of the present disclosure.
Figure 15:
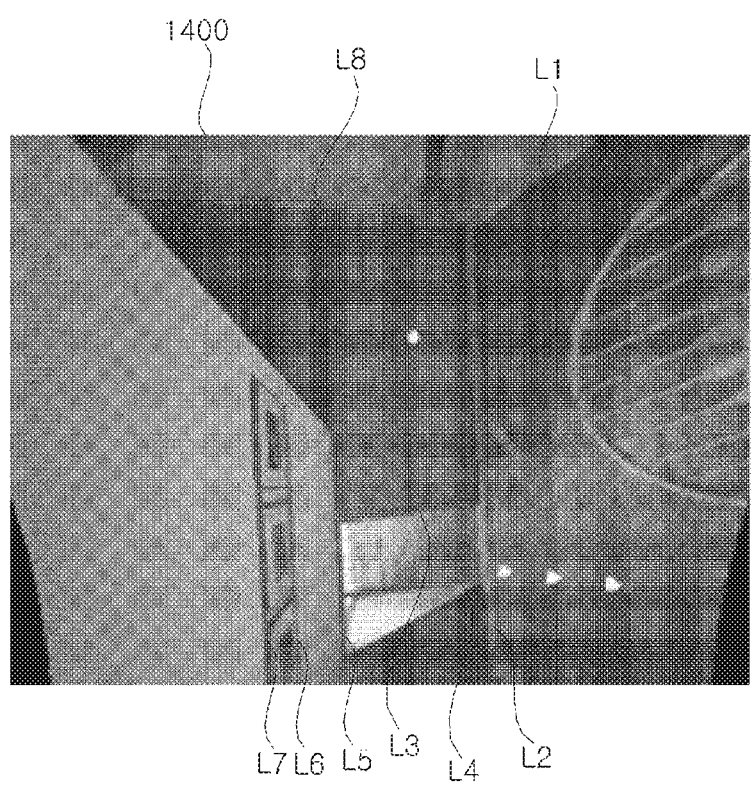

FIGS. 14 and 15 are reference views illustrating block-unit feature extraction and matching according to an embodiment of the present disclosure.

In general, for vision SLAM using an image acquired through a camera sensor, which is a kind of SLAM technology, matching based on a camera-and-point-unit feature point is applied.

A point-unit feature point has an advantage in that, in the case in which the performance of a feature point is excellent, it is possible to restore the location of a 3D point of the feature point based on a relationship with the previous frame image and to easily determine the location of the robot therethrough.

The above-described feature point, such as SIFT, SURF, FAST, BRIEF, or ORB, is widely used as the point-unit feature point, and matching is performed through determination as to whether features points between images are the same based on a specific descriptor that each feature point has, whereby 3D coordinates are restored while having the distance and disparity between the images.

For conventional point-based feature points, a descriptor is basically described based on gradient of a pixel-unit brightness value of an image. In the case in which the lighting of a scene is changed or the gradient of overall brightness of the image is great, therefore, matching between descriptors may not be successfully performed. That is, in the case of self-location technology based on point-unit feature point, performance deterioration may occur in a low-illuminance situation in which a change in characteristics of an image frequently occurs.

Therefore, the present disclosure proposes a map creation and self-location recognition method that uses block-unit feature extraction and matching and is robust to illuminance change and a low-illuminance environment.

Referring to FIG. 14, an image acquired through the image acquisition unit 120 may be divided into blocks B1, B2, B3 . . . Bn-2, Bn-1, and Bn having a predetermined size, and a feature point may be extracted and stored in the unit of each block B1, B2, B3 . . . Bn-2, Bn-1, or Bn.

Subsequently, at the time of self-location recognition, a recognition image acquired at the current location may be divided into blocks B1, B2, B3 . . . Bn-2, Bn-1, and Bn having a predetermined size, and a feature point may be extracted in the unit of each block B1, B2, B3 . . . Bn-2, Bn-1, or Bn and may be compared with the pre-stored block-unit feature point information in order to recognize the self-location.

More preferably, the blocks B1, B2, B3 . . . Bn-2, Bn-1, and Bn may have the same size. Consequently, an image 1400 may be divided in the form of a lattice 1410 constituted by the blocks B1, B2, B3 . . . Bn-2, Bn-1, and Bn having the same size.

Since the blocks have the uniform size, it is possible to reduce the amount of calculation and to more rapidly perform comparison between blocks and comparison between images.

In addition, a descriptor may be calculated and stored based on a feature point extracted from an image acquired through the image acquisition unit 120. Subsequently, at the time of self-location recognition, a recognition image acquired at the current location may be divided into blocks B1, B2, B3 . . . Bn-2, Bn-1, and Bn having a predetermined size, and a feature point may be extracted in the unit of each block B1, B2, B3 . . . Bn-2, Bn-1, or Bn to calculate a descriptor, and similarity between the descriptor and the pre-stored block-unit feature point information may be calculated, and a node having the highest similarity may be recognized as the current self-location.

General self-location recognition based on point-based feature point has excellent location performance but is sensitive to change in illuminance.

In the case in which several uniform areas of an image are designated as block units and block-unit feature point matching technology is applied, however, it is possible to perform self-location recognition robust to a change in illuminance.

In vision SLAM, an image of a ceiling may be acquired, and a feature point of the ceiling may be extracted and used. In this case, it is effective to use a characteristic segment of the ceiling. FIG. 15 illustrates characteristic segments L1, L2, L3, L4, L5, L6, L7, and L8 in the image 1400.

Point-based feature extraction and matching uses a gradient of a brightness value of a pixel corresponding to a feature point. In a low-illuminance environment, the characteristic segments L1, L2, L3, L4, L5, L6, L7, and L8 of the ceiling may not be successfully recognized. For example, in an entire image acquired in a dark environment, it is difficult to determine the characteristic segments of the ceiling and cross between the segments through a change in a brightness value of a pixel.

According to the embodiment of the present disclosure, however, a block-unit gradient may be used, whereby it is possible to more successfully recognize a characteristic segment included in a block-unit image and thus to successfully recognize characteristic segments of the ceiling. In addition, since at least a portion of a segment, such as a lamp or an ornament, is included in each block while maintaining the shape thereof, it is easy to extract a feature point.

According to the embodiment of the present disclosure, image features may be rotated and matched or the traveling direction of the robot may be decided using the segments of the ceiling, whereby the robot is seen to act more intelligently.

According to the embodiment of the present disclosure, block-based feature extraction and matching may be performed. For example, a histogram of gradient in a brightness value by block may be accumulated so as to be determined as block-unit similarity.

According to the present disclosure, the controller 150 may extract a segment of the ceiling from an image of the ceiling or foreground acquired through the image acquisition unit 120 using camera parameters.

In addition, at the time of block-unit feature point matching, the controller 150 may rotate an image to reset an area, and may then perform matching. In this case, segment information of the ceiling may be used such that the motion of the mobile robot 100 appears more intelligent. For example, the mobile robot may travel parallel to the segment of the ceiling, whereby the mobile robot may stably travel while being spaced apart from a wall having a high possibility of being located corresponding to the segment of the ceiling by a predetermined distance.

According to the embodiment of the present disclosure, matching based on block-unit feature points may be used, whereby self-location recognition performance may be guaranteed even in the case in which a change in lighting increases in the previously created map or even in a low-illuminance environment.

According to the embodiment of the present disclosure, at the time of preparing a map, both a point-based feature point and a block-based feature point may be extracted and stored on the map.

Afterwards, therefore, the point-based feature point and the block-based feature point may be used selectively or in a combined state as needed, whereby it is possible to cope with various changes in lighting.

For example, both the point-based feature point and the block-based feature point may be extracted in order to perform accurate self-location recognition using the point-based feature point at the time of preparing the map and to perform robust self-location recognition even in the case in which lighting is changed or even in a low-illuminance environment using the block-based feature point at the time of service.

Also, even in a low-illuminance environment, self-location recognition is possible through self-location recognition based on Monte Carlo localization (MCL) using block-based feature points.

In addition, self-location may be doubly recognized using both the point-based feature point and the block-based feature point, whereby it is possible to further improve accuracy in self-location recognition.

In some embodiments, an image captured in a traveling zone may be divided into blocks corresponding to several areas, and information of each area, such as texture, shape, or contour, may be extracted, and the information may be created as a feature point of each area. Since the information, such as texture, shape, or contour, is characterized in that the information is maintained even in a change in lighting, similarity between the blocks may be calculated based on the feature, and matching may be performed, whereby it is possible to perform matching robust to a change in lighting.

FIGS. 16 to 21 are flowcharts showing mobile robot control methods according to various embodiments of the present disclosure. Hereinafter, mobile robot control methods according to various embodiments of the present disclosure will be described with reference to FIGS. 16 to 21.

Figure 16:
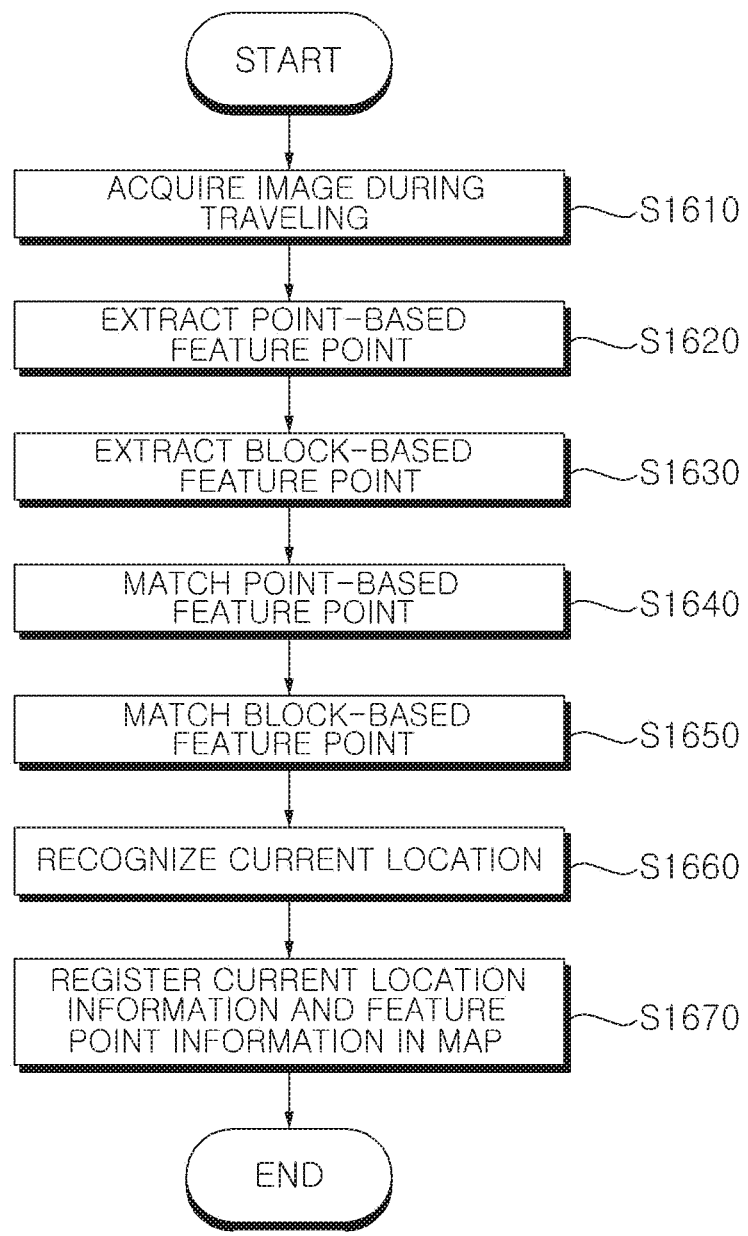
FIGS. 16 to 21 are flowcharts showing mobile robot control methods according to various embodiments of the present disclosure.

FIG. 16 shows an example of a map creation process.

Referring to FIG. 16, the mobile robot 100 according to the embodiment of the present disclosure may acquire an image of the inside of a traveling zone through the image acquisition unit 120 including one or more camera sensors 120*b* during traveling (S1610).

The controller 150 may extract a point-based feature point from the acquired image (S1620). In addition, the controller 150 may divide the acquired image into blocks having a predetermined size, and may extract a feature point from each of the divided block-unit images (S1630).

That is, the method of controlling the mobile robot 100 according to the embodiment of the present disclosure may include a point-based feature point extraction step (S1620), such as SIFT, SURF, FAST, BRIEF, or ORB, which is frequently used in vision SLAM, and may further include a block-based feature point extraction step (S1630) of extracting a feature point from each of the divided block-unit images.

Consequently, both the point-based feature point and the block-based feature point may be utilized for SLAM.

Meanwhile, as described above, the controller 150 may create a descriptor corresponding to the extracted feature point.

For example, in the point-based feature point extraction step (S1620), the controller 140 may extract a point-based feature point, and may create a descriptor corresponding to the extracted feature point based on the distribution characteristics of a brightness gradient of a pixel corresponding to the extracted point-based feature point or pixels belonging to a certain area around each feature point.

In addition, in the block-based feature point extraction step (S1630), the controller 150 may create a descriptor by block based on the distribution characteristics of a brightness gradient of the block-unit images.

Meanwhile, the mobile robot 100 according to the embodiment of the present disclosure may include a traveling sensor for sensing the traveling state of the mobile robot based on the movement of the main body 110. For example, the mobile robot 100 may have a sensor, such as an encoder.

The controller 150 may acquire traveling information from the traveling sensor, such as an encoder, during traveling.

In some embodiments, the controller 150 may perform control such that, in the case in which the amount of movement from the previous node is greater than a threshold value based on the acquired traveling information, an image is acquired through the image acquisition unit 120. It is inefficient to perform image acquisition, analysis, and location recognition again at a location that is too adjacent to the previous node, from which information has already been acquired and recognized. When movement greater than the threshold value is performed from the previous node, therefore, it is effective to acquire an image again and to perform feature point extraction (S1620 and S1630).

Alternatively, in the image acquisition step (S1610), the image acquisition unit 120 may continuously acquire an image of a traveling zone during traveling, or may acquire an image of the traveling zone according to a predetermined criterion or period.

It is inefficient to perform analysis and location recognition again with respect to all image frames acquired at a location that is too adjacent to the previous node, from which information has already been acquired and recognized.

In this case, the controller 150 may select an image corresponding to a location having a movement distance from the previous node greater than the threshold value, among images acquired through the image acquisition unit 120 in the image acquisition step (S1610), as a key frame image. In addition, when a predetermined key frame image is selected, an image acquired at a distance that the mobile robot 100 has moved by more than the threshold value based on the selected key frame image may be selected as the next key frame image.

Consequently, the controller 150 may perform feature point extraction (S1620 and S1630) with respect to key frame images selected corresponding to a location spaced apart by a predetermined distance or more. That is, the point-based feature point extraction step (S1620) and the block-based feature point extraction step (S1630) may be performed with respect to a key frame image corresponding to a location spaced apart from the previous node by more than the threshold value.

Meanwhile, the controller 150 may match feature points of a node corresponding to the current location and a node located within a predetermined reference distance from the node corresponding to the current location (S1640) using the feature point extracted in the point-based feature point extraction step (S1620).

In addition, the controller 150 may match feature points of a node corresponding to the current location and a node located within the reference distance from the node corresponding to the current location (S1650) using a feature point extracted in the block-based feature point extraction step (S1630).

That is, the method of controlling the mobile robot 100 according to the embodiment of the present disclosure may include a point-based feature point matching step (S1640), such as SIFT, SURF, FAST, BRIEF, or ORB, which is frequently used in vision SLAM, and may further include a block-based feature point matching step (S1650) of matching feature points of the divided block-unit images.

Consequently, both the point-based feature point and the block-based feature point may be utilized for SLAM.

Meanwhile, the controller 150 may recognize the current location based on the result of point-based feature point matching and the result of block-based feature point matching (S1660). In this way, the results of two types of feature point matching may be synthetically used, whereby it is possible to further improve accuracy in location recognition.

In addition, the controller 150 may register the recognized current location information, point-based feature point information of the node corresponding to the current location, and block-based feature point information of the node corresponding to the current location on a map (S1670).

According to the embodiment of the present disclosure, a map may be created while both the point-based feature point information and the block-based feature point information are stored, whereby the point-based feature point information and the block-based feature point information may be used selectively or in a combined state at the time of subsequent location recognition.

Figure 17:
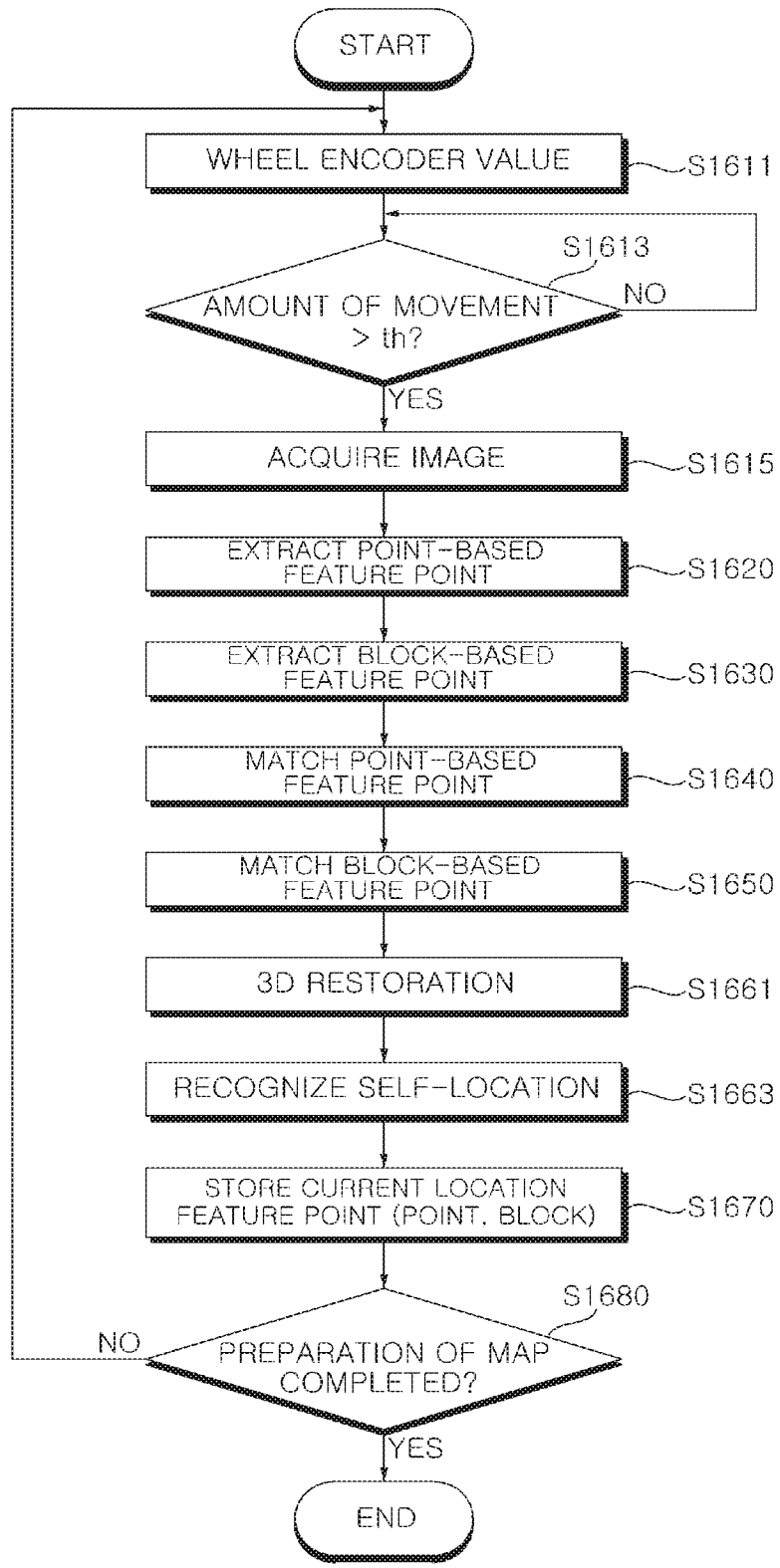

FIG. 17 shows an example of a map creation process.

Referring to FIG. 17, the mobile robot 100 according to the embodiment of the present disclosure may monitor traveling information through the encoder connected to each of the left/right wheel during traveling (S1611).

In the case in which the amount of movement of the mobile robot 100 determined by the value of the wheel encoder is greater than a threshold value th (S1613), the image acquisition unit 120 may acquire a key frame image (S1615).

In the case in which the amount of movement of the mobile robot 100 is not greater than the threshold value th (S1613), the traveling information may be monitored through the encoder until the amount of movement of the mobile robot 100 determined by the value of the wheel encoder is greater than the threshold value th (S1611).

Meanwhile, the controller 150 may extract a point-based feature point (S1620), and may extract a block-based feature point (S1630), from the key frame image.

In addition, the controller 150 may perform point-based feature point matching (S1640), and may perform block-based feature point matching (S1650).

The controller 150 may determine whether features points between images are the same based on a specific descriptor that point-based feature points have, and may perform matching (S1640).

The controller 150 may extract a block-unit feature point to calculate a descriptor, may calculate similarity with a pre-stored block-unit descriptor to determine whether the descriptors are the same feature points, and may perform matching (S1650).

Meanwhile, the controller 150 may restore the location of a 3D point of the feature point based on a relationship between point-based feature points and/or block-based feature points of images (S1661), and may easily determine the location of the mobile robot 100 therethrough (S1663).

The controller 150 determines whether the feature points included in the images are the same and performs matching, whereby 3D coordinates are restored while having the distance and disparity between the images (S1661).

The controller 150 may easily determine the location of the mobile robot 100 based on the restored 3D coordinates (S1663).

After self-location recognition (S1663), the controller 150 may store feature point information of the current location in the storage 105 (S1670). For example, the controller 150 may store node information corresponding to the current location in the SLAM map stored in the storage 105 as the feature point information of the current location.

In addition, the controller 150 may store both the point-based feature point information and the block-based feature point information. At the time of subsequent self-location recognition, therefore, the point-based feature point information and the block-based feature point information may be used selectively or in a combined state.

In the case in which preparation of the map is not completed (S1680), the controller 150 may continuously perform the processes from step S1611 to step S1670 while continuing traveling. When the preparation of the map is completed (S1680), the processes from step S1611 to step S1670 may be finished.

According to the embodiment of the present disclosure, it is possible to create a map robust to various environmental changes, such as changes in lighting, illuminance, time zone, and object location, using block-based feature extraction and matching. Block-based feature extraction and matching is more advantageous in extracting a characteristic segment of a ceiling than point-based feature extraction and matching. Consequently, it is possible to realize vision SLAM technology capable of operating even in a low-illuminance environment and to provide excellent SLAM technology even in a low-illuminance environment using block-based feature extraction and matching.

Figure 18:
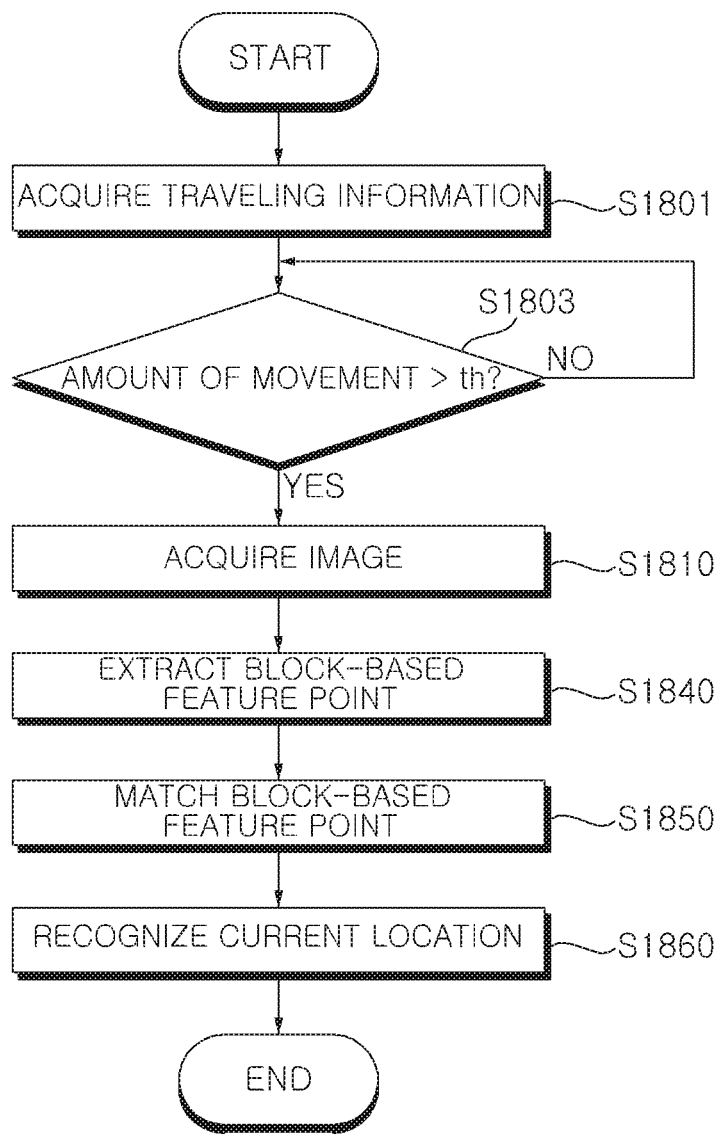
Figure 19:
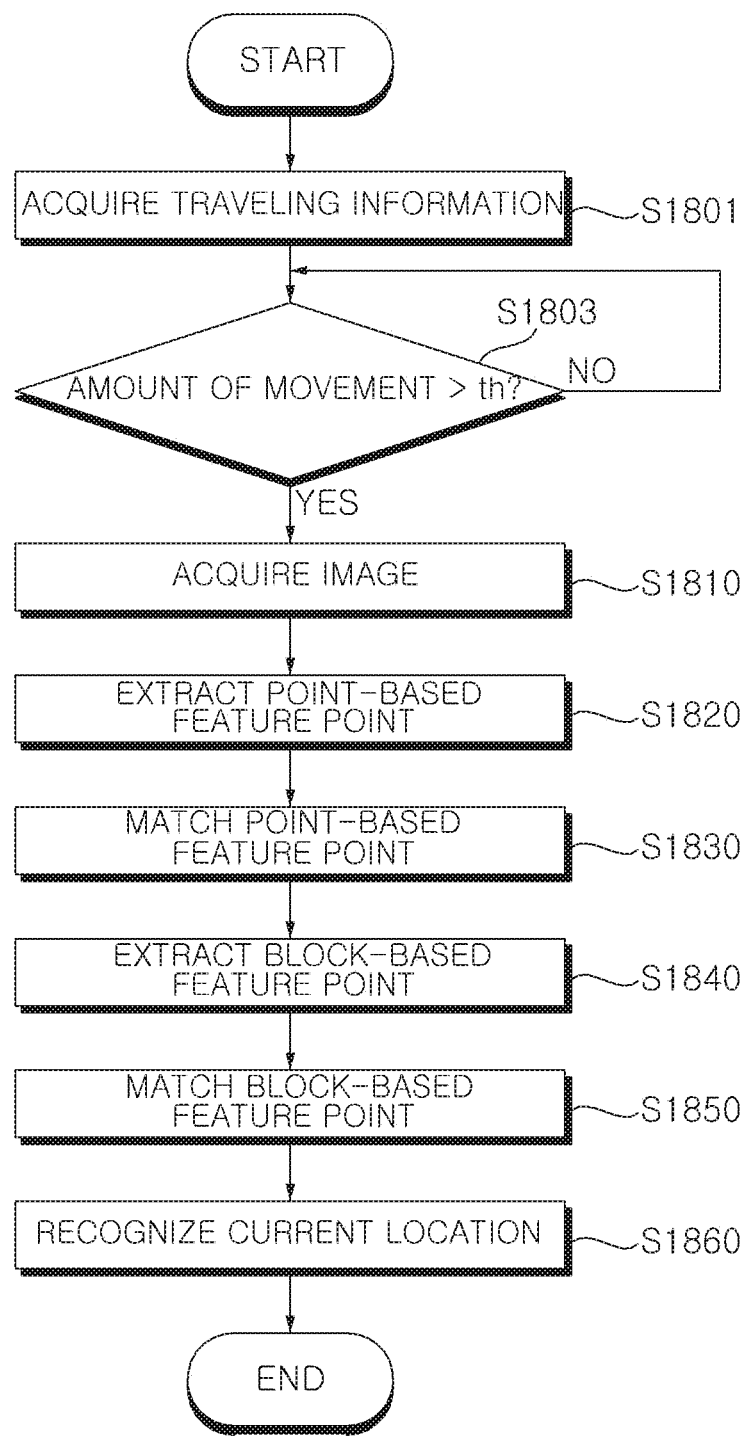

FIGS. 18 and 19 show a self-location recognition process after map creation.

Referring to FIGS. 18 and 19, the mobile robot 100 according to the embodiment of the present disclosure may monitor traveling information through the traveling sensor during traveling (S1801).

A gyro sensor, a wheel sensor, or an acceleration sensor may be used as the traveling sensor. Data sensed by at least one of the traveling sensors or data calculated based on data sensed by at least one of the traveling sensors may constitute odometry information.

For example, the controller 150 may determine the amount of movement of the mobile robot 100 based on a sensing value of the wheel sensor, such as an encoder connected to the left/right wheel. In addition, the controller 150 may acquire the amount of movement of the mobile robot 100 and direction information based on the sensing value of the wheel sensor to determine traveling displacement.

Meanwhile, in the case in which the determined amount of movement of the mobile robot 100 is greater than the threshold value th (S1803), the image acquisition unit 120 may acquire an image in the traveling zone (S1810).

Subsequently, the controller 150 may divide the acquired image into blocks having a predetermined size, and may extract a feature point from each of the divided block-unit images (S1840).

In another embodiment, in the image acquisition step (S1810), the image acquisition unit 120 may continuously acquire an image of the traveling zone during traveling, or may acquire an image of the traveling zone according to a predetermined criterion or period.

In this case, the controller 150 may select an image corresponding to a location having a movement distance from the previous node greater than the threshold value, among images acquired through the image acquisition unit 120 in the image acquisition step (S1810), as a key frame image. In addition, when a predetermined key frame image is selected, the controller 150 may select an image acquired at a distance that the mobile robot 100 has moved by more than the threshold value based on the selected key frame image as the next key frame image.

A subsequent block-based feature point extraction step (S1840) may be performed with respect to a key frame image corresponding to a location spaced apart from the previous node by more than the threshold value th.

In the block-based feature point extraction step (S1840), the controller 150 may extract a feature point using the distribution characteristics (the direction in which brightness is changed and the abrupt degree of change) of a brightness gradient of the block-unit images.

According to the embodiment of the present disclosure, a block-unit gradient may be used, whereby it is possible to more successfully recognize a characteristic segment included in a block-unit image and thus to successfully recognize characteristic segments of the ceiling. In addition, since at least a portion of a segment, such as a lamp or an ornament, is included in each block while maintaining the shape thereof, it is easy to extract a feature point.

Meanwhile, in the block-based feature point extraction step (S1840), the controller 150 may create a descriptor by block based on the distribution characteristics (the direction in which brightness is changed and the abrupt degree of change) of a brightness gradient of the block-unit images.

The controller 150 may match the feature point extracted in the block-based feature point extraction step (S1840) with the block-based feature point information registered on the map (S1850), and may recognize the current location of the mobile robot 100 based on the result of block-based feature point matching (S1860).

In the block-based feature point matching step (S1850), the controller 150 may compare the distribution characteristics of a brightness gradient of the acquired image and block-unit images included in an image of a comparison target node to determine the same feature points.

In addition, the controller 150 may compare a descriptor by block based on the distribution characteristics of a brightness gradient of the acquired image and the block-unit images included in the image of the comparison target node with a pre-stored descriptor by block to determine a descriptor having the highest similarity.

According to the embodiment of the present disclosure, it is possible to divide a recognition image acquired at the current location into blocks having a predetermined size and to extract a feature point in the unit of a block (S1840) and to compare the extracted feature point with pre-stored block-unit feature point information (S1850), whereby it is possible to recognize the self-location (S1860).

Also, in the case in which a descriptor is calculated and stored based on a feature point extracted from an image acquired through the image acquisition unit 200, at the time of self-location recognition, it is possible to divide a recognition image acquired at the current location into blocks having a predetermined size and to extract a feature point in the unit of a block to calculate a descriptor (S1840), to calculate similarity with a pre-stored block-unit descriptor (S1850), and to recognize a node having the highest similarity as the current self-location (S1860).

According to the embodiment of the present disclosure, it is possible to accurately recognize the location of the mobile robot on the map using block-based feature extraction and matching. Block-based feature extraction and matching is more advantageous in extracting a characteristic segment of a ceiling than point-based feature extraction and matching. Consequently, it is possible to realize vision SLAM technology capable of operating even in a low-illuminance environment and to provide excellent SLAM technology even in a low-illuminance environment using block-based feature extraction and matching.

Also, in the case in which the mobile robot 100 performs cleaning, it is possible to perform efficient traveling and cleaning based on a single map capable of coping with various environmental changes and accurate location recognition.

According to the embodiment of the present disclosure, it is possible to create a map robust to various environmental changes, such as changes in lighting, illuminance, time zone, and object location, using block-based feature extraction and matching.

Meanwhile, according to the present disclosure, it is possible to store both the point-based feature point information and the block-based feature point information at the time of creating a map. Consequently, it is possible to use the point-based feature point information and the block-based feature point information selectively or in a combined state for self-location recognition.

Referring to FIG. 19, the method of controlling the mobile robot 100 according to the embodiment of the present disclosure may include a point-based feature point extraction step (S1820) of extracting a point-based feature point from an image acquired in the image acquisition step (S1810) and a step (S1830) of matching the feature point extracted in the point-based feature point extraction step (S1820) with point-based feature point information registered on the map.

In this case, in the current location recognition step (S1860), the controller 150 may recognize the current location based on the result of the point-based feature point matching and the result of the block-based feature point matching.

The controller 150 may create a descriptor corresponding to the extracted feature point based on the distribution characteristics of a brightness gradient of pixels belonging to a certain area around the extracted feature point, and may compare the created descriptor with a pre-stored descriptor to recognize the current location (S1860).

In addition, the controller 150 may combine the point-based feature point information and the block-based feature point information to recognize the current location (S1860).

For example, the controller 150 may recognize a node having the highest similarity as the current location based on the result of the point-based feature point matching and the result of the block-based feature point matching.

Meanwhile, according to the embodiment of the present disclosure, it is possible to use the point-based feature point information and the block-based feature point information selectively or in a combined state depending on an illuminance environment.

Figure 20:
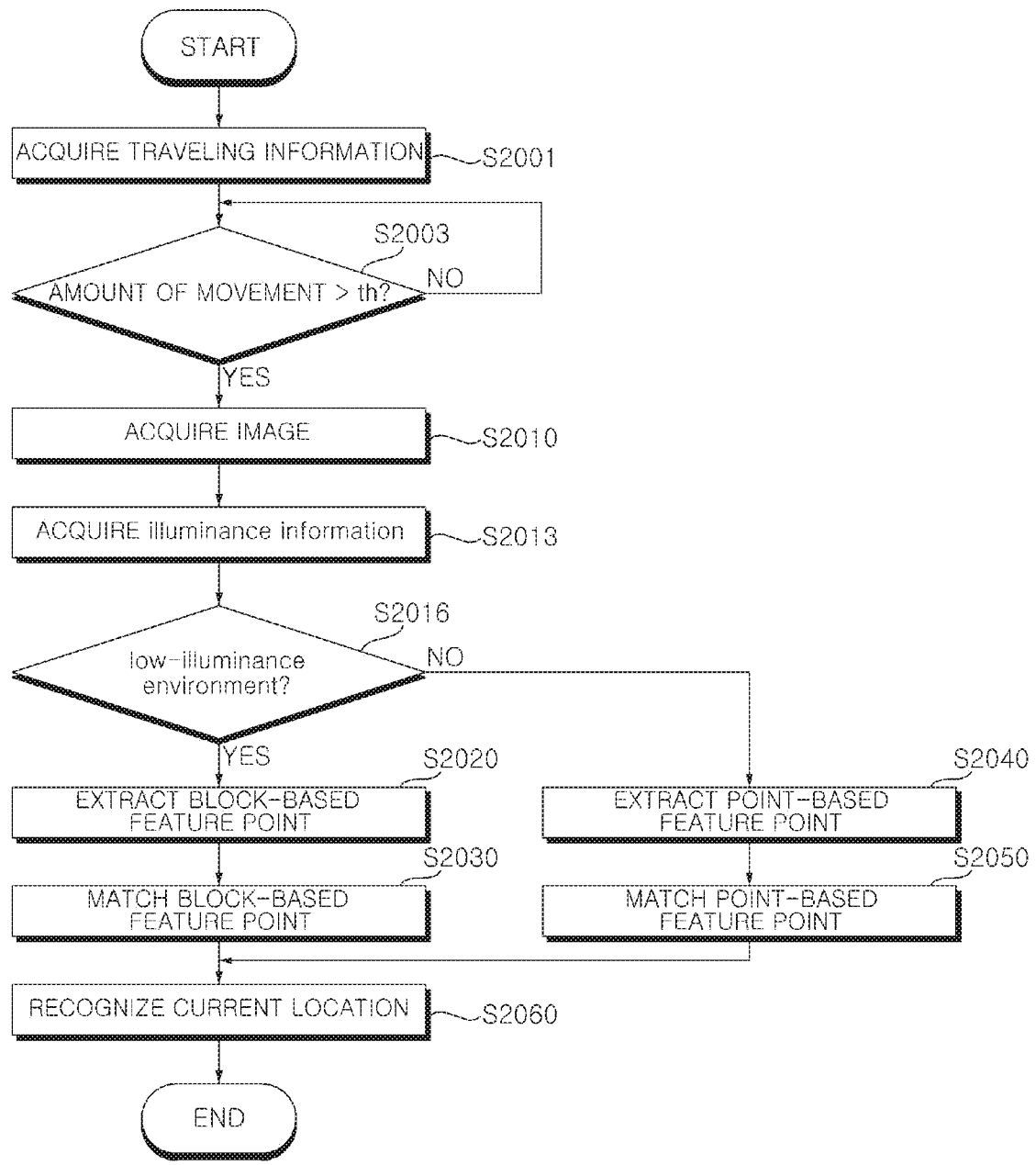

Referring to FIG. 20, the mobile robot 100 according to the embodiment of the present disclosure may acquire an image of the inside of a traveling zone through the image acquisition unit 120 (S2010).

The mobile robot 100 according to the embodiment of the present disclosure may monitor traveling information through the traveling sensor during traveling (S2001).

The controller 150 may determine the amount of movement of the mobile robot 100 based on a sensing value of the traveling sensor (S2001).

In some embodiments, in the case in which the determined amount of movement of the mobile robot 100 is greater than the threshold value th (S2003), the image acquisition unit 120 may acquire a key frame image in the traveling zone (S2010).

Alternatively, the controller may select an image corresponding to a location having a movement distance from the previous node greater than the threshold value th, among images acquired through the image acquisition unit 120 in the image acquisition step (S2010), as a key frame image.

Meanwhile, according to the embodiment of the present disclosure, the sensor unit 170 of the mobile robot 100 may include an illuminance sensor for sensing illuminance outside the main body 110.

In this embodiment, the mobile robot 100 may acquire illuminance information through the illuminance sensor of the sensor unit 170 (S2013).

In the case in which the illuminance information does not satisfy a condition set as a low-illuminance environment (S2016), the controller 150 may extract a point-based feature point from all key frame images acquired through the image acquisition unit 120 (S2040), may match the feature point extracted in the point-based feature point extraction step (S2040) with point-based feature point information registered on the map (S2050), and may recognize the current location based on the result of point-based feature point matching (S2060).

In the case in which the illuminance information satisfies a condition set as a low-illuminance environment (S2016), the controller 150 may divide all key frame images acquired through the image acquisition unit 120 into a plurality of blocks, and may extract a feature point in the unit of a block (S2020).

In addition, the controller 150 may match the feature point extracted in the block-based feature point extraction step (S2020) with block-based feature point information registered on the map (S2030), and may recognize the current location based on the result of block-based feature point matching (S2060).

In some embodiments, upon discriminating that the illuminance information indicates a low-illuminance environment (S2016), all of the block-based feature point extraction (S2020) and matching (S2030) and the point-based feature point extraction (S2040) and matching (S2050) may be performed, and the results may be collected to recognize the current location (S2060).

According to the embodiment of the present disclosure, a known Monte Carlo localization (MCL) method may be used at the time of self-location recognition (S1860 and S2060). The Monte Carlo localization (MCL) method uses a particle filter algorithm.

Figure 21:
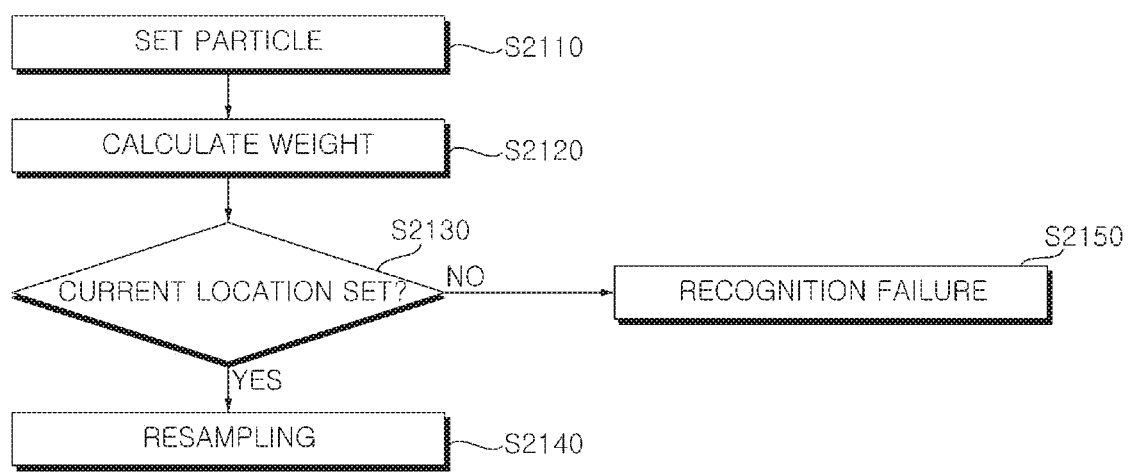

Referring to FIG. 21, the controller 150 may set a plurality of particles, which are location candidates, (S2110) based on block-based feature point matching (S1850 and S2020).

The controller 150 may set n particles according to a predetermine criterion (S2110). For example, the controller 150 may set a predetermined number of particles having the same weight.

Subsequently, the controller 150 may calculate a weight for the particles (S2120), and may decide the current location based on the weight of the particles (S2130).

The controller 150 may disperse the particles, which are assumed location candidates, on the map like dust (S2110), may calculate the weight (S2120), and may decide the current location (S2130).

The controller 150 may perform operation for changing the weight of each particle depending on similarity of the result of block-based feature point matching. For example, the controller 150 may increase the weight in proportion to similarity, or may increase the weight in inverse proportion to a difference.

The controller 150 may decide a specific particle as the current location based on the weight of each particle, or may decide the current location based on the average of weights of a plurality of particles having high weights.

Meanwhile, in the case in which the current location is decided (S2130), the controller 150 may resample a plurality of particles for subsequent location recognition (S2140). For example, the controller may set a plurality of particles based on the decided current location.

In some embodiments, in the case in which the current location is not decided (S2130), failure of location recognition may be determined (S2150).

The mobile robot according to the present disclosure and the method of controlling the same are not limitedly applied to the constructions and methods of the embodiments as previously described; rather, all or some of the embodiments may be selectively combined to achieve various modifications.

Similarly, although operations are shown in a specific sequence in the drawings, this does not mean that the operations must be performed in the specific sequence or sequentially in order to obtain desired results or that all of the operations must be performed. In a specific case, multitasking and parallel processing may be advantageous.

Meanwhile, the method of controlling the mobile robot according to the embodiment of the present disclosure may be implemented as code that can be written on a processor-readable recording medium and thus read by a processor. The processor-readable recording medium may be any type of recording device in which data is stored in a processor-readable manner. The processor-readable recording medium may include, for example, read only memory (ROM), random access memory (RAM), compact disc read only memory (CD-ROM), magnetic tape, a floppy disk, and an optical data storage device, and may be implemented in the form of a carrier wave transmitted over the Internet. In addition, the processor-readable recording medium may be distributed over a plurality of computer systems connected to a network such that processor-readable code is written thereto and executed therefrom in a decentralized manner.

As is apparent from the above description, according to at least one of the embodiments of the present disclosure, it is possible to create a map robust to various environmental changes, such as changes in lighting, illuminance, time zone, and object location, using block-based feature extraction and matching.

In addition, according to at least one of the embodiments of the present disclosure, it is possible to accurately recognize the location of a mobile robot on a map using block-based feature extraction and matching.

In addition, according to at least one of the embodiments of the present disclosure, it is possible to realize vision SLAM technology capable of operating even in a low-illuminance environment.

In addition, according to at least one of the embodiments of the present disclosure, it is possible to provide excellent SLAM technology even in a low-illuminance environment using block-based feature extraction and matching.

In addition, according to at least one of the embodiments of the present disclosure, it is possible to perform efficient traveling and cleaning based on a single map capable of coping with various environmental changes and accurate location recognition.

Various other effects of the present disclosure are directly or suggestively disclosed in the above detailed description of the disclosure.

It will be apparent that, although the preferred embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. A method of controlling a mobile robot, the method comprising:
   acquiring an image of an inside of a traveling zone as the mobile robot travels in the traveling zone;
   performing a point-based feature point extraction by extracting a first feature point from the acquired image;
   performing a block-based feature point extraction by dividing the acquired image into blocks having a predetermined size and extracting a second feature point from each of the divided block-unit images;
   performing a point-based feature point matching by comparing feature points of a first node corresponding to a current location of the mobile robot and a second node located within a predetermined reference distance from the first node using the first feature point;

performing a block-based feature point matching by matching the feature points of the first node and the second node using the second feature point;

determining the current location based on the point-based feature point matching and the block-based feature point matching; and storing the determined current location in association with the first feature point and the second feature point in a map.

2. The method according to claim 1, wherein the point-based feature point extraction comprises creating a descriptor corresponding to the extracted first feature point based on distribution characteristics of a brightness gradient of pixels belonging to a certain area around the extracted first feature point.

3. The method according to claim 1, wherein the block-based feature point extraction comprises creating a descriptor by block based on distribution characteristics of a brightness gradient of the block-unit images.

4. The method according to claim 1, further comprising:
acquiring traveling information, including an amount of movement of the mobile robot; and
acquiring the image using an image acquisition unit when the amount of movement from a previous node is greater than a threshold value.

5. The method according to claim 1, further comprising:
acquiring traveling information, including an amount of movement of the mobile robot; and
selecting a key frame image from among images acquired by an image acquisition unit, the key frame image corresponding to an amount of movement from a previous node greater than a threshold value; and
performing the point-based feature point extraction and the block-based feature point extraction using the key frame image.

6. A method of controlling a mobile robot, the method comprising:
acquiring an image of an inside of a traveling zone as the mobile robot travels in the traveling zone;
performing block-based feature point extraction by dividing the acquired image into blocks having a predetermined size and extracting first feature points from each of the divided block-unit images;
performing block-based feature point matching by comparing the extracted first feature points with second feature points stored in a map, the second feature points having been extracted using the block-based feature point extraction; and
determining a current location of the mobile robot based on a result of the block-based feature point matching.

7. The method according to claim 6, wherein the block-based feature point extraction comprises creating a descriptor by block based on distribution characteristics of a brightness gradient of the block-unit images.

8. The method according to claim 6, further comprising:
performing a point-based feature point extraction by extracting a feature point from the acquired image; and
matching the extracted feature point with one or more feature points stored on the map, the stored feature points having been obtained using the point-based feature point extraction; and determining the current location of the mobile robot based on a first result of the point-based feature point matching and a second result of the block-based feature point matching.

9. The method according to claim 8, wherein the point-based feature point extraction comprises creating a descriptor corresponding to the extracted feature point based on distribution characteristics of a brightness gradient of pixels belonging to a certain area around the extracted feature point.

10. The method according to claim 6, further comprising:
acquiring traveling information, including an amount of movement of the mobile robot; and
acquiring the image using an image acquisition unit when the amount of movement from a previous node is greater than a threshold value.

11. The method according to claim 6, further comprising:
acquiring traveling information, including an amount of movement of the mobile robot; and
selecting a key frame image from images acquired by an image acquisition unit, the key frame image corresponding to the amount of movement from a previous node greater than a threshold value; and
performing the block-based feature point extraction on the key frame image.

12. The method according to claim 6, further comprising:
acquiring illuminance information through a sensor unit; and
performing the block-based feature point extraction when the illuminance information corresponds to a low-illuminance environment.

13. The method according to claim 12, further comprising:
performing point-based feature point extraction by extracting a feature point from the acquired image when the illuminance information does not correspond to the low-illuminance environment;
performing a point-based feature point matching by comparing the extracted feature point with one or more feature points stored on the map. the stored feature points having been obtained using the point-based feature point extraction; and
determining the current location of the mobile robot based on the point-based feature point matching.

14. The method according to claim 13, wherein the point-based feature point extraction comprises creating a descriptor corresponding to the extracted feature point based on distribution characteristics of a brightness gradient of pixels belonging to a certain area around the extracted feature point.

15. The method according to claim 6, wherein determining the current location comprises:
setting a plurality of particles, which are location candidates, based on the block-based feature point matching;
determining weights for the particles;
determining the current location based on the weights; and
resampling the particles.

* * * * *